US008082051B2

(12) United States Patent
Mihelich et al.

(10) Patent No.: US 8,082,051 B2
(45) Date of Patent: Dec. 20, 2011

(54) AUDIO TUNING SYSTEM

(75) Inventors: Ryan J. Mihelich, Indianapolis, IN (US); Bradley F. Eid, Greenwood, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 1265 days.

(21) Appl. No.: 11/496,355

(22) Filed: Jul. 31, 2006

(65) Prior Publication Data

US 2007/0025559 A1 Feb. 1, 2007

Related U.S. Application Data

(60) Provisional application No. 60/703,748, filed on Jul. 29, 2005.

(51) Int. Cl.
*G06F 17/00* (2006.01)
*H04R 5/02* (2006.01)

(52) U.S. Cl. .......................................... 700/94; 381/303

(58) Field of Classification Search .................... 700/94; 381/300, 303

See application file for complete search history.

(56) References Cited

U.S. PATENT DOCUMENTS

| | | | | |
|---|---|---|---|---|
| 5,581,621 | A | 12/1996 | Koyama et al. | 381/103 |
| 6,108,426 | A | 8/2000 | Stortz | 381/77 |
| 6,449,368 | B1 * | 9/2002 | Davis et al. | 381/1 |
| 6,674,864 | B1 | 1/2004 | Kitamura | |
| 7,391,869 | B2 | 6/2008 | Eid et al. | 381/22 |
| 7,526,093 | B2 | 4/2009 | Devantier | 381/59 |
| 2001/0017921 | A1 | 8/2001 | Ohta | 381/98 |
| 2003/0031333 | A1 * | 2/2003 | Cohen et al. | 381/303 |
| 2004/0091123 | A1 | 5/2004 | Stark et al. | 381/86 |
| 2004/0125487 | A9 | 7/2004 | Sternad et al. | |
| 2004/0125967 | A1 | 7/2004 | Eid et al. | 381/99 |
| 2004/0258259 | A1 | 12/2004 | Koyama | 381/307 |
| 2005/0031129 | A1 | 2/2005 | Devantier | 381/18 |
| 2005/0031130 | A1 | 2/2005 | Devantier | 381/59 |
| 2005/0031135 | A1 | 2/2005 | Devantier | 381/59 |
| 2005/0031143 | A1 | 2/2005 | Devantier et al. | 381/300 |
| 2005/0063554 | A1 | 3/2005 | Devantier | 381/99 |

(Continued)

FOREIGN PATENT DOCUMENTS

EP 0898364 A2 2/1999

(Continued)

OTHER PUBLICATIONS

Notice of Decision for Patent dated Mar. 24, 2009, issued in Korean Patent Application No. 10-2007-7003971 (5 pages with English translation).

(Continued)

*Primary Examiner* — Davetta W Goins
*Assistant Examiner* — Joseph Saunders, Jr.
(74) *Attorney, Agent, or Firm* — Brinks Hofer Gilson & Lione

(57) ABSTRACT

An audio system installed in a listening space may include a signal processor and a plurality of loudspeakers. The audio system may be tuned with an automated audio tuning system to optimize the sound output of the loudspeakers within the listening space. The automated audio tuning system may provide automated processing to determine at least one of a plurality of settings, such as channel equalization settings, delay settings, gain settings, crossover settings, bass optimization settings and group equalization settings. The settings may be generated by the automated audio tuning system based on an audio response produced by the loudspeakers in the audio system. The automated tuning system may generate simulations of the application of settings to the audio response to optimize tuning.

35 Claims, 15 Drawing Sheets

U.S. PATENT DOCUMENTS

| | | | | |
|---|---|---|---|---|
| 2005/0069153 | A1 | 3/2005 | Hall et al. | 381/103 |
| 2006/0147057 | A1 | 7/2006 | Aggarwal et al. | |
| 2007/0098190 | A1 | 5/2007 | Song et al. | 381/120 |
| 2009/0154723 | A1 | 6/2009 | Choi et al. | 381/80 |
| 2010/0290643 | A1 | 11/2010 | Mihelich et al. | 381/99 |

FOREIGN PATENT DOCUMENTS

| | | | |
|---|---|---|---|
| EP | 1126744 | A2 | 8/2001 |
| EP | 1 241 922 | A2 | 9/2002 |
| EP | 1355514 | A2 | 10/2003 |
| EP | 1 523 221 | A2 | 4/2005 |
| JP | 2001-224099 | A | 8/2001 |
| JP | 2002-369299 | A | 12/2002 |
| JP | 2004-007604 | | 1/2004 |
| JP | 2005-012534 | A | 1/2005 |
| JP | 2005-151539 | A | 6/2005 |
| WO | WO 2007/116802 | A1 | 10/2007 |

OTHER PUBLICATIONS

Office Action dated Mar. 20, 2009, issued in Chinese Patent Application No. 200680001063.2 (10 pages with English translation).

Office Action dated Sep. 25, 2009, issued in Chinese Patent Application No. 200680001063.2 (6 pages with English translation).

Office Action dated Sep. 25, 2009, issued in Chinese Patent Application No. 200680001063.2 (English translation, 4 pages), Correct date believed to be Jan. 8, 2010.

Office Action dated Mar. 8, 2010, issued in Japanese Patent Application No. 2007-530515 (8 pages with English translation).

Office Action dated Feb. 28, 2008, in Korean Patent Application No. 10-2007-7003971 (5 pages).

Office Action dated May 22, 2008, in Canadian Patent Application No. 2,568,916 (3 pages).

Office Action dated Dec. 18, 2008, in European Patent Application No. 06 789 045.9 (5 pages).

Japanese Office Action dated Jun. 5, 2009, issued in Japanese Patent Application No. 2007-530515, with English translation, 13 pages.

U.S. Appl. No. 12/782,143, filed May 18, 2010.

European Office Action dated Apr. 7, 2010, for EP 06789045, filed Jul. 31, 2006.

European Office Action dated Jul. 4, 2011, for EP 06789045, filed Jul. 31, 2006.

* cited by examiner

AUDIO TUNING SYSTEM

PRIORITY CLAIM

This application claims the benefit of priority from U.S. Provisional Application No. 60/703,748 filed Jul. 29, 2005, which is incorporated by reference.

BACKGROUND OF THE INVENTION

1. Technical Field

The invention generally relates to multimedia systems having loudspeakers. More particularly, the invention relates to an automated audio tuning system that optimizes the sound output of a plurality of loudspeakers in an audio system based on the configuration and components of the audio system.

2. Related Art

Multimedia systems, such as home theater systems, home audio systems, vehicle audio/video systems are well known. Such systems typically include multiple components that include a sound processor driving loudspeakers with amplified audio signals. Multimedia systems may be installed in an almost unlimited amount of configurations with various components. In addition, such multimedia systems may be installed in listening spaces of almost unlimited sizes, shapes and configurations. The components of a multimedia system, the configuration of the components and the listening space in which the system is installed all may have significant impact on the audio sound produced.

Once installed in a listening space, a system may be tuned to produce a desirable sound field within the space. Tuning may include adjusting the equalization, delay, and/or filtering to compensate for the equipment and/or the listening space. Such tuning is typically performed manually using subjective analysis of the sound emanating from the loudspeakers. Accordingly, consistency and repeatability is difficult. This may especially be the case when different people manually tune two different audio systems. In addition, significant experience and expertise regarding the steps in the tuning process, and selective adjustment of parameters during the tuning process may be necessary to achieve a desired result.

SUMMARY

An automated audio tuning system is configurable with audio system specific configuration information related to an audio system to be tuned. In addition, the automated audio tuning system may include a response matrix. Audio responses of a plurality of loudspeakers included in the audio system may be captured with one or more microphones and stored in the response matrix. The measured audio responses can be in-situ responses, such as from inside a vehicle, and/or laboratory audio responses. The automated tuning system may include one or more engines capable of generating settings for use in the audio system. The settings may be downloaded into the audio system to configure the operational performance of the audio system.

Generation of settings with the automated audio tuning system may be with one or more of an amplified equalization engine, a delay engine, a gain engine, a crossover engine, a bass optimization engine and a system optimization engine. In addition, the automated audio tuning system includes a settings application simulator. The setting applications simulator may generate simulations based on application of one or more of the settings and/or the audio system specific configuration information to the measured audio responses. The engines may use one or more of the simulations or the measured audio responses and the system specific configuration information to generate the settings.

The amplified equalization engine may generate channel equalization settings. The channel equalization settings may be downloaded and applied to amplified audio channels in the audio system. The amplified audio channels may each drive one or more loudspeakers. The channel equalization settings may compensate for anomalies or undesirable features in the operational performance of the loudspeakers. The delay and gain engines may generate respective delay and gain settings for each of the amplified audio channels based on listening positions in a listening space where the audio system is installed and operational.

The crossover engine may determine a crossover setting for a group of the amplified audio channels that are configured to drive respective loudspeakers operating in different frequency ranges. The combined audible output of the respective loudspeakers driven by the group of amplified audio channels may be optimized by the crossover engine using the crossover settings. The bass optimization engine may optimize the audible output of a determined group of low frequency loudspeakers by generating individual phase adjustments for each of the respective amplified output channels driving the loudspeakers in the group. The system optimization engine may generate group equalization settings for groups of amplified output channels. The group equalization settings may be applied to one or more of the input channels of the audio system, or one or more of the steered channels of the audio system so that groups of the amplified output channels will be equalized.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
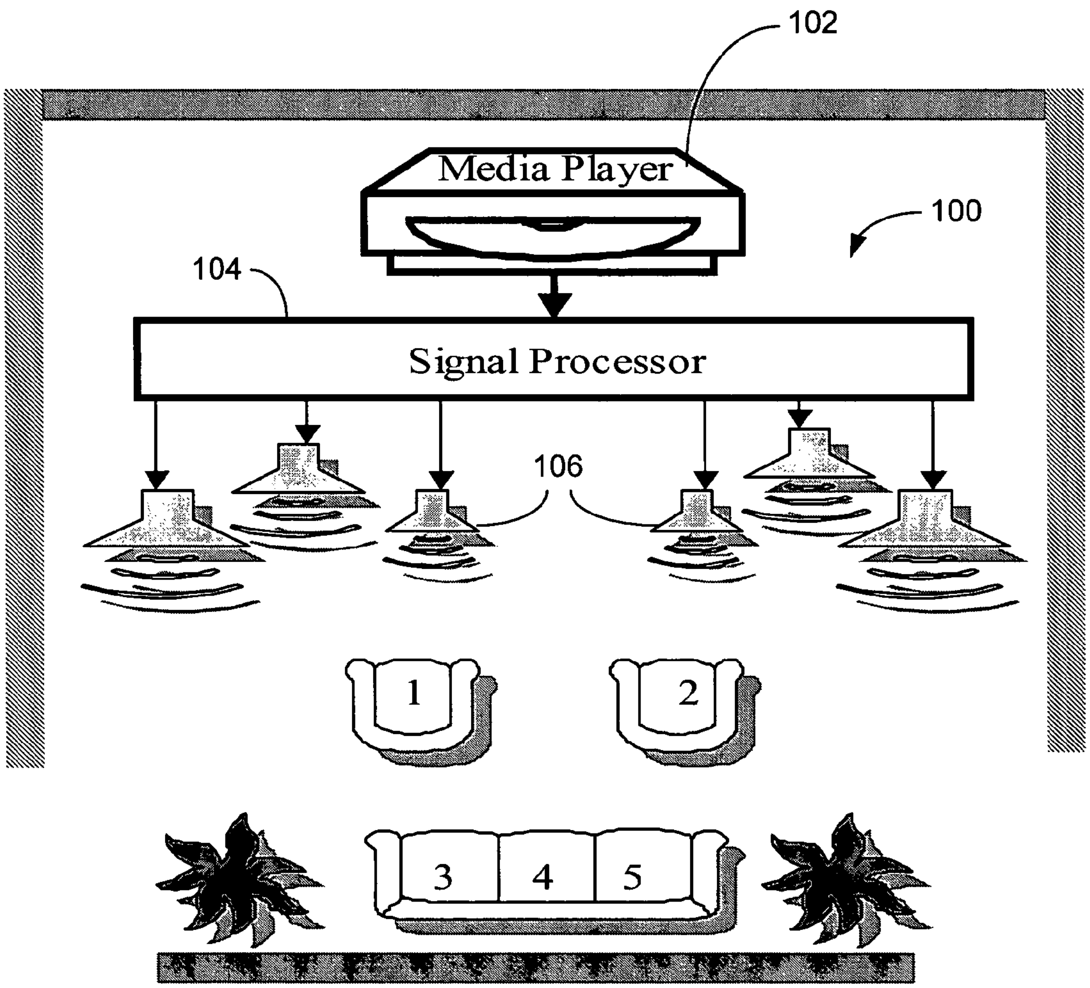
FIG. 1 is a diagram of an example listening space that includes an audio system.

FIG. 1 illustrates an example audio system 100 in an example listening space. In FIG. 1, the example listening space is depicted as a room. In other examples, the listening space may be in a vehicle, or in any other space where an audio system can be operated. The audio system 100 may be any system capable of providing audio content. In FIG. 1, the audio system 100 includes a media player 102, such as a compact disc, video disc player, etc., however, the audio system 100 may include any other form of audio related devices, such as a video system, a radio, a cassette tape player, a wireless or wireline communication device, a navigation system, a personal computer, or any other functionality or device that may be present in any form of multimedia system. The audio system 100 also includes a signal processor 104 and a plurality of loudspeakers 106 forming a loudspeaker system.

The signal processor 104 may be any computing device capable of processing audio and/or video signals, such as a computer processor, a digital signal processor, etc. The signal processor 104 may operate in association with a memory to execute instructions stored in the memory. The instructions may provide the functionality of the multimedia system 100. The memory may be any form of one or more data storage devices, such as volatile memory, non-volatile memory, electronic memory, magnetic memory, optical memory, etc. The loudspeakers 106 may be any form of device capable of translating electrical audio signals to audible sound.

During operation, audio signals may be generated by the media player 102, processed by the signal processor 104, and used to drive one or more of the loudspeakers 106. The loudspeaker system may consist of a heterogeneous collection of audio transducers. Each transducer may receive an independent and possibly unique amplified audio output signal from the signal processor 104. Accordingly, the audio system 100 may operate to produce mono, stereo or surround sound using any number of loudspeakers 106.

An ideal audio transducer would reproduce sound over the entire human hearing range, with equal loudness, and minimal distortion at elevated listening levels. Unfortunately, a single transducer meeting all these criteria is difficult, if not impossible to produce. Thus, a typical loudspeaker 106 may utilize two or more transducers, each optimized to accurately reproduce sound in a specified frequency range. Audio signals with spectral frequency components outside of a transducer's operating range may sound unpleasant and/or might damage the transducer.

The signal processor 104 may be configured to restrict the spectral content provided in audio signals that drive each transducer. The spectral content may be restricted to those frequencies that are in the optimum playback range of the loudspeaker 106 being driven by a respective amplified audio output signal. Sometimes even within the optimum playback range of a loudspeaker 106, a transducer may have undesirable anomalies in its ability reproduce sounds at certain frequencies. Thus, another function of the signal processor 104 may be to provide compensation for spectral anomalies in a particular transducer design.

Another function of the signal processor 104 may be to shape a playback spectrum of each audio signal provided to each transducer. The playback spectrum may be compensated with spectral colorization to account for room acoustics in the listening space where the transducer is operated. Room acoustics may be affected by, for example, the walls and other room surfaces that reflect and/or absorb sound emanating from each transducer. The walls may be constructed of materials with different acoustical properties. There may be doors, windows, or openings in some walls, but not others. Furniture and plants also may reflect and absorb sound. Therefore, both listening space construction and the placement of the loudspeakers 106 within the listening space may affect the spectral and temporal characteristics of sound produced by the audio system 100. In addition, the acoustic path from a transducer to a listener may differ for each transducer and each seating position in the listening space. Multiple sound arrival times may inhibit a listener's ability to precisely localize a sound, i.e., visualize a precise, single position from which a sound originated. In addition, sound reflections can add further ambiguity to the sound localization process. The signal processor 104 also may provide delay of the signals sent to each transducer so that a listener within the listening space experiences minimum degradation in sound localization.

Figure 2:
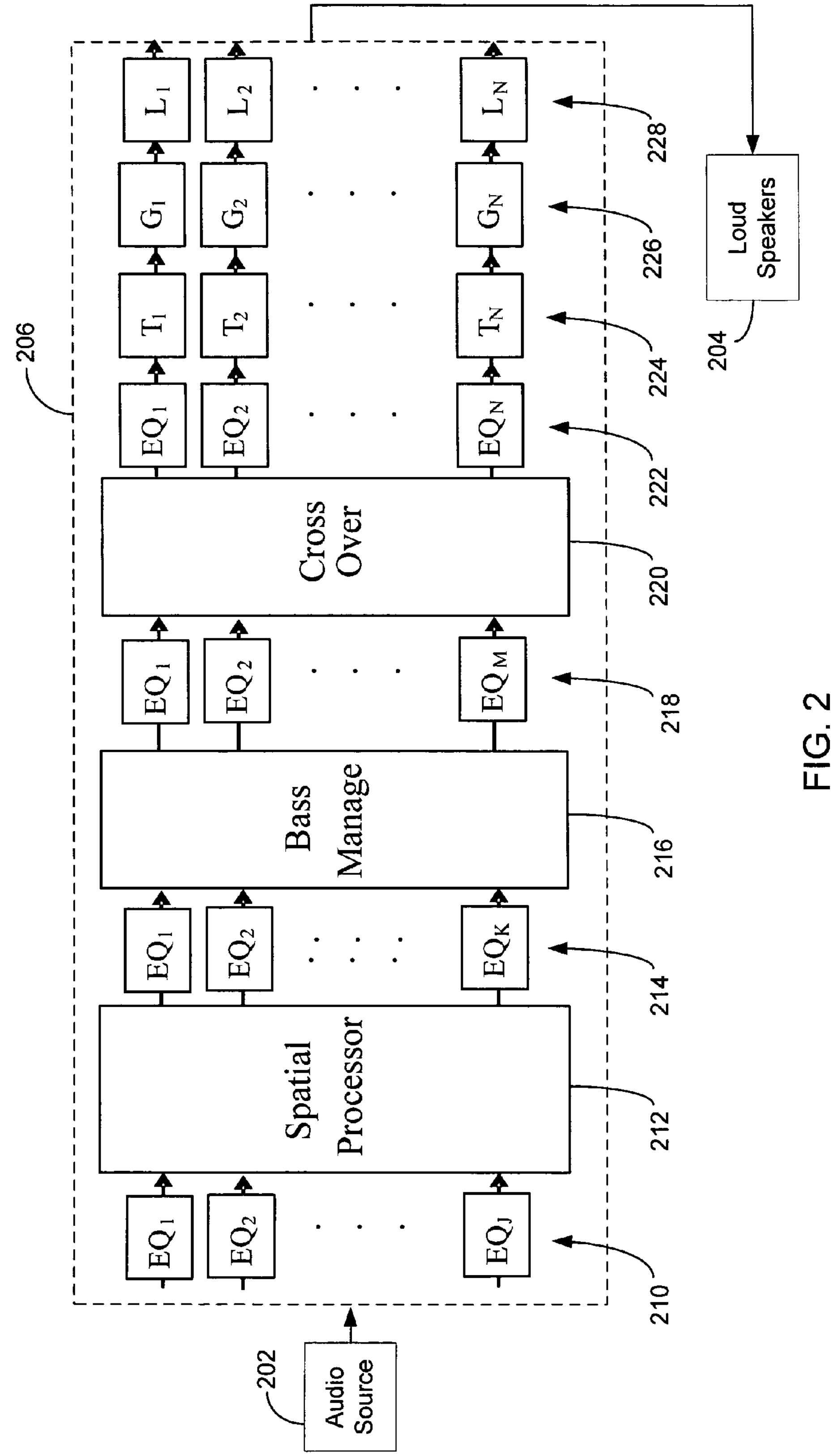
FIG. 2 is a block diagram depicting a portion of the audio system of FIG. 1 that includes a audio source, an audio signal processor, and loudspeakers.

FIG. 2 is an example block diagram that depicts an audio source 202, one or more loudspeakers 204, and an audio signal processor 206. The audio source 202 may include a compact disc player, a radio tuner, a navigation system, a mobile phone, a head unit, or any other device capable of generating digital or analog input audio signals representative of audio sound. In one example, the audio source 202 may provide digital audio input signals representative of left and right stereo audio input signals on left and right audio input channels. In another example, the audio input signals may be any number of channels of audio input signals, such as six audio channels in Dolby 6.1™ surround sound.

The loudspeakers 204 may be any form of one or more transducers capable of converting electrical signals to audible sound. The loudspeakers 204 may be configured and located to operate individually or in groups, and may be in any frequency range. The loudspeakers may collectively or individually be driven by amplified output channels, or amplified audio channels, provided by the audio signal processor 206.

The audio signal processor 206 may be one or more devices capable of performing logic to process the audio signals supplied on the audio channels from the audio source 202. Such devices may include digital signal processors (DSP), microprocessors, field programmable gate arrays (FPGA), or any other device(s) capable of executing instructions. In addition, the audio signal processor 206 may include other signal processing components such as filters, analog-to-digital converters (A/D), digital-to-analog (D/A) converters, signal amplifiers, decoders, delay, or any other audio processing mechanisms. The signal processing components may be hardware based, software based, or some combination thereof. Further, the audio signal processor 206 may include memory, such as one or more volatile and/or non-volatile memory devices, configured to store instructions and/or data. The instructions may be executable within the audio signal processor 206 to process audio signals. The data may be parameters used/updated during processing, parameters generated/updated during processing, user entered variables, and/or any other information related to processing audio signals.

In FIG. 2, the audio signal processor 206 may include a global equalization block 210. The global equalization block 210 includes a plurality of filters ($EQ_1$-$EQ_J$) that may be used to equalize the input audio signals on a respective plurality of input audio channels. Each of the filters ($EQ_1$-$EQ_J$) may include one filter, or a bank of filters, that include settings defining the operational signal processing functionality of the respective filter(s). The number of filters (J) may be varied based on the number of input audio channels. The global equalization block 210 may be used to adjust anomalies or any other properties of the input audio signals as a first step in processing the input audio signals with the audio signal processor 206. For example, global spectral changes to the input audio signals may be performed with the global equalization block 210. Alternatively, where such adjustment of the input audio signals in not desirable, the global equalization block 210 may be omitted.

The audio signal processor 206 also may include a spatial processing block 212. The spatial processing block 212 may receive the globally equalized, or unequalized, input audio signals. The spatial processing block 212 may provide processing and/or propagation of the input audio signals in view of the designated loudspeaker locations, such as by matrix decoding of the equalized input audio signals. Any number of spatial audio input signals on respective steered channels may be generated by the spatial processing block 212. Accordingly, the spatial processing block 212 may up mix, such as from two channels to seven channels, or down mix, such as from six channels to five channels. The spatial audio input signals may be mixed with the spatial processing block 212 by any combination, variation, reduction, and/or replication of the audio input channels. An example spatial processing block 212 is the Logic7™ system by Lexicon™. Alternatively, where spatial processing of the input audio signals is not desired, the spatial processing block 212 may be omitted.

The spatial processing block 212 may be configured to generate a plurality of steered channels. In the example of Logic 7 signal processing, a left front channel, a right front channel, a center channel, a left side channel, a right side channel, a left rear channel, and a right rear channel may constitute the steered channels, each including a respective spatial audio input signal. In other examples, such as with Dolby 6.1 signal processing, a left front channel, a right front channel, a center channel, a left rear channel, and a right rear channel may constitute the steered channels produced. The steered channels also may include a low frequency channel designated for low frequency loudspeakers, such as a subwoofer. The steered channels may not be amplified output channels, since they may be mixed, filtered, amplified etc. to form the amplified output channels. Alternatively, the steered channels may be amplified output channels used to drive the loudspeakers 204.

The pre-equalized, or not, and spatially processed, or not, input audio signals may be received by a second equalization module that can be referred to as a steered channel equalization block 214. The steered channel equalization block 214 may include plurality of filters ($EQ_1$-$EQ_K$) that may be used to equalize the input audio signals on a respective plurality of steered channels. Each of the filters ($EQ_1$-$EQ_K$) may include one filter, or a bank of filters, that include settings defining the operational signal processing functionality of the respective filter(s). The number of filters (K) may be varied based on the number of input audio channels, or the number of spatial audio input channels depending on whether the spatial processing block 212 is present. For example, when the spatial processing block 212 is operating with Logic 7™ signal processing, there may be seven filters (K) operable on seven steered channels, and when the audio input signals are a left and right stereo pair, and the spatial processing block 212 is omitted, there may be two filters (K) operable on two channels.

The audio signal processor 206 also may include a bass management block 216. The bass management block 216 may manage a low frequency portion of one or more audio output signals provided on respective amplified output channels. The low frequency portion of the selected audio output signals may be re-routed to other amplified output channels. The re-routing of the low frequency portions of audio output signals may be based on consideration of the respective loudspeaker(s) 204 being driven by the amplified output channels. The low frequency energy that may otherwise be included in audio output signals may be re-routed with the bass management block 216 from amplified output channels that include audio output signals driving loudspeakers 204 that are not designed for re-producing low frequency audible energy. The bass management block 216 may re-route such low frequency energy to output audio signals on amplified output channels that are capable of reproducing low frequency audible energy. Alternatively, where such bass management is not desired, the steered channel equalization block 214 and the bass management block 216 may be omitted.

The pre-equalized, or not, spatially processed, or not, spatially equalized, or not, and bass managed, or not, audio signals may be provided to a bass managed equalization block 218 included in the audio signal processor 206. The bass managed equalization block 218 may include a plurality of filters ($EQ_1$-$EQ_M$) that may be used to equalize and/or phase adjust the audio signals on a respective plurality of amplified output channels to optimize audible output by the respective loudspeakers 204. Each of the filters ($EQ_1$-$EQ_M$) may include one filter, or a bank of filters, that include settings defining the operational signal processing functionality of the respective filter(s). The number of filters (M) may be varied based on the number of audio channels received by the bass managed equalization block 218.

Tuning the phase to allow one or more loudspeakers 204 driven with an amplified output channel to interact in a particular listening environment with one or more other loudspeakers 204 driven by another amplified output channel may be performed with the bass managed equalization block 218. For example, filters ($EQ_1$-$EQ_M$) that correspond to an amplified output channel driving a group of loudspeakers representative of a left front steered channel and filters ($EQ_1$-$EQ_M$)

corresponding to a subwoofer may be tuned to adjust the phase of the low frequency component of the respective audio output signals so that the left front steered channel audible output, and the subwoofer audible output may be introduced in the listening space to result in a complimentary and/or desirable audible sound.

The audio signal processor 206 also may include a crossover block 220. Amplified output channels that have multiple loudspeakers 204 that combine to make up the full bandwidth of an audible sound may include crossovers to divide the full bandwidth audio output signal into multiple narrower band signals. A crossover may include a set of filters that may divide signals into a number of discrete frequency components, such as a high frequency component and a low frequency component, at a division frequency(s) called the crossover frequency. A respective crossover setting may be configured for each of a selected one or more amplified output channels to set one or more crossover frequency(s) for each selected channel.

The crossover frequency(s) may be characterized by the acoustic effect of the crossover frequency when a loudspeaker 204 is driven with the respective output audio signal on the respective amplified output channel. Accordingly, the crossover frequency is typically not characterized by the electrical response of the loudspeaker 204. For example, a proper 1 kHz acoustic crossover may require a 900 Hz low pass filter and a 1200 Hz high pass filter in an application where the result is a flat response throughout the bandwidth. Thus, the crossover block 220 includes a plurality of filters that are configurable with filter parameters to obtain the desired crossover(s) settings. As such, the output of the crossover block 220 is the audio output signals on the amplified output channels that have been selectively divided into two or more frequency ranges depending on the loudspeakers 204 being driven with the respective audio output signals.

A channel equalization block 222 also may be included in the audio signal processing module 206. The channel equalization block 222 may include a plurality of filters ($EQ_1$-$EQ_N$) that may be used to equalize the audio output signals received from the crossover block 220 as amplified audio channels. Each of the filters ($EQ_1$-$EQ_N$) may include one filter, or a bank of filters, that include settings defining the operational signal processing functionality of the respective filter(s). The number of filters (N) may be varied based on the number of amplified output channels.

The filters ($EQ_1$-$EQ_N$) may be configured within the channel equalization block 222 to adjust the audio signals in order to adjust undesirable transducer response characteristics. Accordingly, consideration of the operational characteristics and/or operational parameters of one or more loudspeakers 204 driven by an amplified output channel may be taken into account with the filters in the channel equalization block 222. Where compensation for the operational characteristics and/or operational parameters of the loudspeakers 204 is not desired, the channel equalization block 222 may be omitted.

The signal flow in FIG. 2 is one example of what might be found in an audio system. Simpler or more complex variations are also possible. In this general example, there may be a (J) input channel source, (K) processed steered channels, (M) bass managed outputs and (N) total amplified output channels. Accordingly, adjustment of the equalization of the audio signals may be performed at each step in the signal chain. This may help to minimize the number of filters used in the system overall, since in general N>M>K>J. Global spectral changes to the entire frequency spectrum could be applied with the global equalization block 210. In addition, equalization may be applied to the steered channels with the steered channel equalization block 214. Thus, equalization within the global equalization block 210 and the steered channel equalization block 214 may be applied to groups of the amplified audio channels. Equalization with the bass managed equalization block 218 and the channel equalization block 222, on the other hand, is applied to individual amplified audio channels.

Equalization that occurs prior to the spatial processor block 212 and the bass manager block 216 may constitute linear phase filtering if different equalization is applied to any one audio input channel, or any group of amplified output channels. The linear phase filtering may be used to preserve the phase of the audio signals that are processed by the spatial processor block 212 and the bass manager block 216. Alternatively, the spatial processor block 212 and/or the bass manager block 216 may include phase correction that may occur during processing within the respective modules.

The audio signal processor 206 also may include a delay block 224. The delay block 224 may be used to delay the amount of time an audio signal takes to be processed through the audio signal processor 206 and drive the loudspeakers 204. The delay block 224 may be configured to apply a variable amount of delay to each of the audio output signals on a respective amplified output channel. The delay block 224 may include a plurality of delay blocks ($T_1$-$T_N$) that correspond to the number of amplified output channels. Each of the delay blocks ($T_1$-$T_N$) may include configurable parameters to select the amount of delay to be applied to a respective amplified output channel.

In one example, each of the delay blocks may be a simple digital tap-delay block based on the following equation:

$$y[t]=x[t-n] \qquad \text{EQUATION 1}$$

where x is the input to a delay block at time t, y is the output of the delay block at time t, and n is the number of samples of delay. The parameter n is a design parameter and may be unique to each loudspeaker 204, or group of loudspeakers 204 on an amplified output channel. The latency of an amplified output channel may be the product of n and a sample-period. The filter block can be one or more infinite impulse response (IIR) filters, finite impulse response filters (FIR), or a combination of both. Filter processing by the delay block 224 also may incorporate multiple filter banks processed at different sample-rates. Where no delay is desired, the delay block 224 may be omitted.

A gain optimization block 226 also may be included in the audio signal processor 206. The gain optimization block 226 may include a plurality of gain blocks ($G_1$-$G_N$) for each respective amplified output channel. The gain blocks ($G_1$-$G_N$) may be configured with a gain setting that is applied to each of the respective amplified output channels (Quantity N) to adjust the audible output of one or more loudspeakers 204 being driven by a respective channel. For example, the average output level of the loudspeakers 204 in a listening space on different amplified output channels may be adjusted with the gain optimization block 226 so that the audible sound levels emanating from the loudspeakers 204 are perceived to be about the same at listening positions within the listening space. Where gain optimization is not desired, such as in a situation where the sound levels in the listening positions are perceived to be about the same without individual gain adjustment of the amplified output channels, the gain optimization block 226 may be omitted.

The audio signal processor 206 also may include a limiter block 228. The limiter block 228 may include a plurality of limit blocks ($L_1$-$L_N$) that correspond to the quantity (N) of amplified output channels. The limit blocks ($L_1$-$L_N$) may be configured with limit settings based on the operational ranges of the loudspeakers 204, to manage distortion levels, or any other system limitation(s) that warrants limiting the magnitude of the audio output signals on the amplified output channels. One function of the limiter block 228 may be to constrain the output voltage of the audio output signals. For example, the limiter block 228 may provide a hard-limit where the audio output signal is never allowed to exceed some user-defined level. Alternatively, the limiter block 228 may constrain the output power of the audio output signals to some user-defined level. In addition, the limiter block 228 may use predetermined rules to dynamically manage the audio output signal levels. In the absence of a desire to limit the audio output signals, the limiter block 228 may be omitted.

In FIG. 2, the modules of the audio signal processor 206 are illustrated in a specific configuration, however, any other configuration may be used in other examples. For example, any of the channel equalization block 222, the delay block 224, the gain block 226, and the limiter block 228 may be configured to receive the output from the crossover block 220. Although not illustrated, the audio signal processor 206 also may amplify the audio signals during processing with sufficient power to drive each transducer. In addition, although the various blocks are illustrated as separate blocks, the functionality of the illustrated blocks may be combined or expanded into multiple blocks in other examples.

Equalization with the equalization blocks, namely, the global equalization block 210, the steering channel equalization block 214, the bass managed equalization block 218, and the channel equalization block 222 may be developed using parametric equalization, or non-parametric equalization.

Parametric equalization is parameterized such that humans can intuitively adjust parameters of the resulting filters included in the equalization blocks. However, because of the parameterization, flexibility in the configuration of filters is lessened. Parametric equalization is a form of equalization that may utilize specific relationships of coefficients of a filter. For example, a bi-quad filter may be a filter implemented as a ratio of two second order polynomials. The specific relationship between coefficients may use the number of coefficients available, such as the six coefficients of a bi-quad filter, to implement a number of predetermined parameters. Predetermined parameters such as a center frequency, a bandwidth and a filter gain may be implemented while maintaining a predetermined out of band gain, such as an out of band gain of one.

Non-parametric equalization is computer generated filter parameters that directly use digital filter coefficients. Non-parametric equalization may be implemented in at least two ways, finite impulse response (FIR) and infinite impulse response (IIR) filters. Such digital coefficients may not be intuitively adjustable by humans, but flexibility in configuration of the filters is increased, allowing more complicated filter shapes to be implemented efficiently.

Non-parametric equalization may use the full flexibility of the coefficients of a filter, such as the six coefficients of a bi-quad filter, to derive a filter that best matches the response shape needed to correct a given frequency response magnitude or phase anomaly. If a more complex filter shape is desired, a higher order ratio of polynomials can be used. In one example, the higher order ratio of polynomials may be later broken up (factored) into bi-quad filters. Non-parametric design of these filters can be accomplished by several methods that include: the Method of Prony, Steiglitz-McBride iteration, the eigen-filter method or any other methods that yield best fit filter coefficients to an arbitrary frequency response (transfer function). These filters may include an all-pass characteristic where only the phase is modified and the magnitude is unity at all frequencies.

Figure 3:
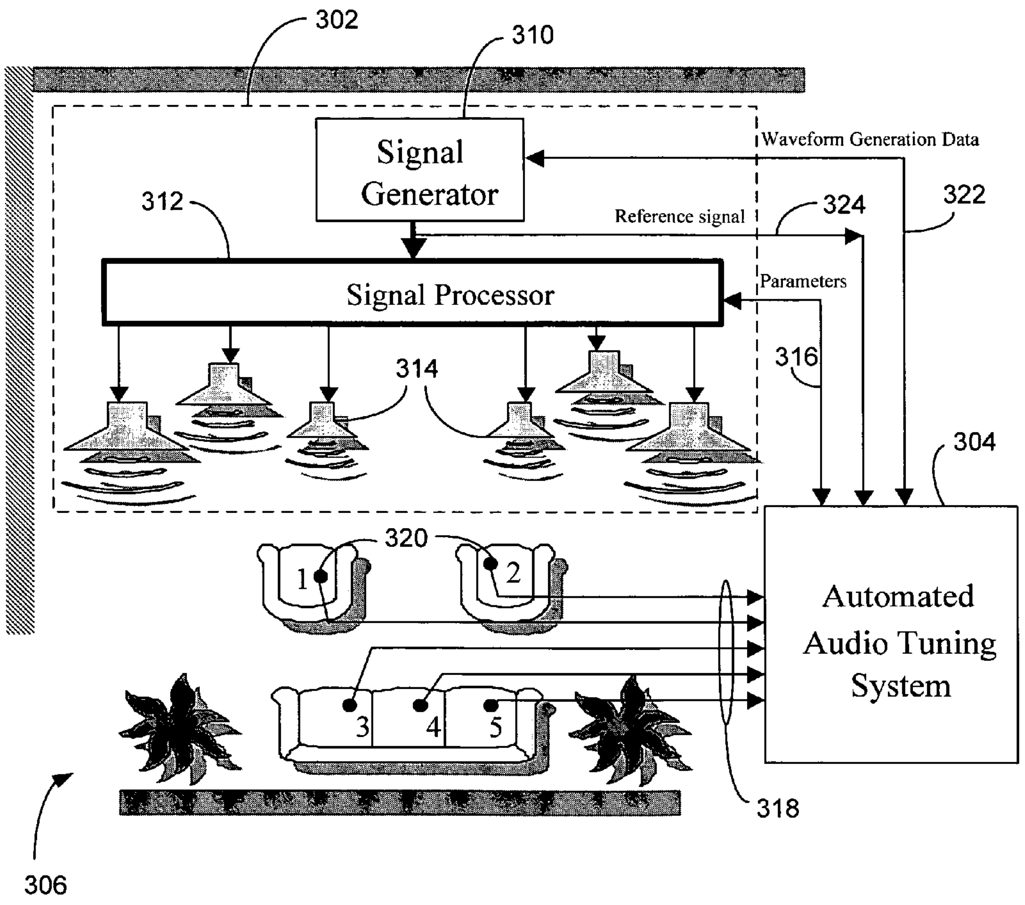
FIG. 3 is a diagram of a listening space, the audio system of FIG. 1, and an automated audio tuning system.

FIG. 3 depicts an example audio system 302 and an automated audio tuning system 304 included in a listening space 306. Although the illustrated listening space is a room, the listening space could be a vehicle, an outdoor area, or any other location where an audio system could be installed and operated. The automated audio tuning system 304 may be used for automated determination of the design parameters to tune a specific implementation of an audio system. Accordingly, the automated audio tuning system 304 includes an automated mechanism to set design parameters in the audio system 302.

The audio system 302 may include any number of loudspeakers, signal processors, audio sources, etc. to create any form of audio, video, or any other type of multimedia system that generates audible sound. In addition, the audio system 302 also may be setup or installed in any desired configuration, and the configuration in FIG. 3 is only one of many possible configurations. In FIG. 3, for purposes of illustration, the audio system 302 is generally depicted as including a signal generator 310, a signal processor 312, and loudspeakers 314, however, any number of signal generation devices and signal processing devices, as well as any other related devices may be included in, and/or interfaced with, the audio system 302.

The automated audio tuning system 304 may be a separate stand alone system, or may be included as part of the audio system 302. The automated audio tuning system 304 may be any form of logic device, such as a processor, capable of executing instructions, receiving inputs and providing a user interface. In one example, the automated audio tuning system 304 may be implemented as a computer, such as a personal computer, that is configured to communicate with the audio system 302. The automated audio tuning system 304 may include memory, such as one or more volatile and/or non-volatile memory devices, configured to store instructions and/or data. The instructions may be executed within the automated audio tuning system 304 to perform automated tuning of an audio system. The executable code also may provide the functionality, user interface, etc., of the automated audio tuning system 304. The data may be parameters used/updated during processing, parameters generated/updated during processing, user entered variables, and/or any other information related to processing audio signals.

The automated audio tuning system 304 may allow the automated creation, manipulation and storage of design parameters used in the customization of the audio system 302. In addition, the customized configuration of the audio system 302 may be created, manipulated and stored in an automated fashion with the automated audio tuning system 304. Further, manual manipulation of the design parameters and configuration of the audio system 302 also may be performed by a user of the automated audio tuning system 304.

The automated audio tuning system 304 also may include input/output (I/O) capability. The I/O capability may include wireline and/or wireless data communication in serial or parallel with any form of analog or digital communication protocol. The I/O capability may include a parameters communication interface 316 for communication of design parameters and configurations between the automated audio tuning system 304 and the signal processor 312. The parameters communication interface 316 may allow download of design parameters and configurations to the signal processor 312. In addition, upload to the automated audio tuning system 304 of the design parameters and configuration currently being used by the signal processor may occur over the parameters communication interface 316.

The I/O capability of the automated audio tuning system 304 also may include at least one audio sensor interface 318, each coupled with an audio sensor 320, such as a microphone. In addition, the I/O capability of the automated tuning system 304 may include a waveform generation data interface 322, and a reference signal interface 324. The audio sensor interface 318 may provide the capability of the automated audio tuning system 304 to receive as input signals one or more audio input signals sensed in the listening space 306. In FIG. 3, the automated audio tuning system 304 receives five audio signals from five different listening positions within the listening space. In other examples, fewer or greater numbers of audio signals and/or listening positions may be used. For example, in the case of a vehicle, there may be four listening positions, and four audio sensors 320 may be used at each listening position. Alternatively, a single audio sensor 320 can be used, and moved among all listening positions. The automated audio tuning system 304 may use the audio signals to measure the actual, or in-situ, sound experienced at each of the listening positions.

The automated audio tuning system 304 may generate test signals directly, extract test signals from a storage device, or control an external signal generator to create test waveforms. In FIG. 3, the automated audio tuning system 304 may transmit waveform control signals over the waveform generation data interface 322 to the signal generator 310. Based on the waveform control signals, the signal generator 310 may output a test waveform to the signal processor 312 as an audio input signal. A test waveform reference signal produced by the signal generator 310 also may be output to the automated audio tuning system 304 via the reference signal interface 324. The test waveform may be one or more frequencies having a magnitude and bandwidth to fully exercise and/or test the operation of the audio system 302. In other examples, the audio system 302 may generate a test waveform from a compact disc, a memory, or any other storage media. In these examples, the test waveform may be provided to the automated audio tuning system 304 over the waveform generation interface 322.

In one example, the automated audio tuning system 304 may initiate or direct initiation of a reference waveform. The reference waveform may be processed by the signal processor 312 as an audio input signal and output on the amplified output channels as an audio output signal to drive the loudspeakers 314. The loudspeakers 314 may output an audible sound representative of the reference waveform. The audible sound may be sensed by the audio sensors 320, and provided to the automated audio tuning system 304 as input audio signals on the audio sensor interface 318. Each of the amplified output channels driving loudspeakers 314 may be driven, and the audible sound generated by loudspeakers 314 being driven may be sensed by the audio sensors 320.

In one example, the automated audio tuning system 304 is implemented in a personal computer (PC) that includes a sound card. The sound card may be used as part of the I/O capability of the automated audio tuning system 304 to receive the input audio signals from the audio sensors 320 on the audio sensor interface 318. In addition, the sound card may operate as a signal generator to generate a test waveform that is transmitted to the signal processor 312 as an audio input signal on the waveform generation interface 322. Thus, the signal generator 310 may be omitted. The sound card also may receive the test waveform as a reference signal on the reference signal interface 324. The sound card may be controlled by the PC, and provide all input information to the automated audio tuning system 304. Based on the I/O received/sent from the soundcard, the automated audio tuning system 304 may download/upload design parameters to/from the signal processor 312 over the parameters interface 316.

Using the audio input signal(s) and the reference signal, the automated audio tuning system 304 may automatically determine design parameters to be implemented in the signal processor 312. The automated audio tuning system 304 also may include a user interface that allows viewing, manipulation and editing of the design parameters. The user interface may include a display, and an input device, such as a keyboard, a mouse and or a touch screen. In addition, logic based rules and other design controls may be implemented and/or changed with the user interface of the automated audio tuning system 304. The automated audio tuning system 304 may include one or more graphical user interface screens, or some other form of display that allows viewing, manipulation and changes to the design parameters and configuration.

In general, example automated operation by the automated audio tuning system 304 to determine the design parameters for a specific audio system installed in a listening space may be preceded by entering the configuration of the audio system of interest and design parameters into the automated audio tuning system 304. Following entry of the configuration information and design parameters, the automated audio tuning system 304 may download the configuration information to the signal processor 312. The automated audio tuning system 304 may then perform automated tuning in a series of automated steps as described below to determine the design parameters.

Figure 4:
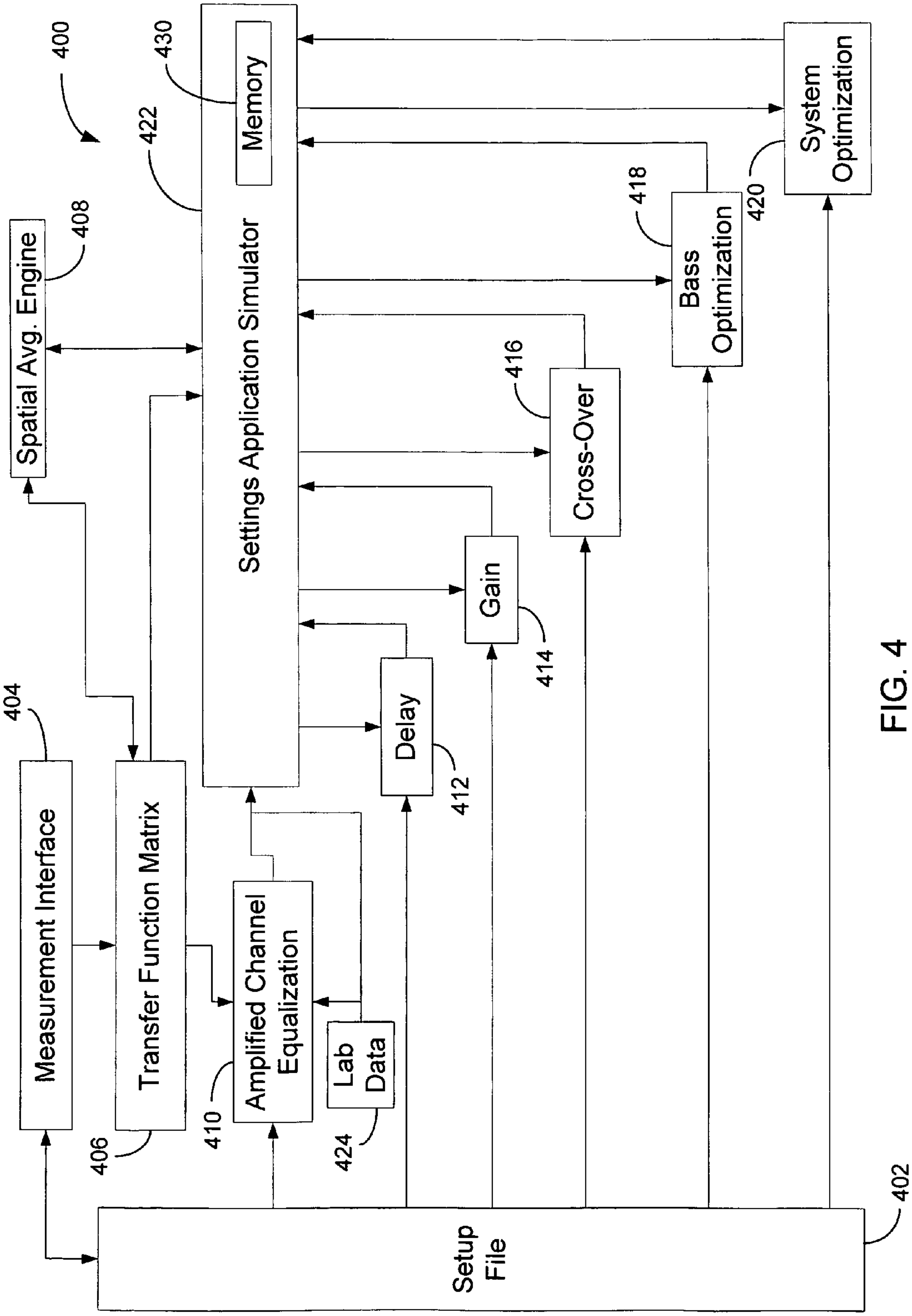
FIG. 4 is a block diagram of an automated audio tuning system.

FIG. 4 is a block diagram of an example automated audio tuning system 400. The automated audio tuning system 400 may include a setup file 402, a measurement interface 404, a transfer function matrix 406, a spatial averaging engine 408, an amplified channel equalization engine 410, a delay engine 412, a gain engine 414, a crossover engine 416, a bass optimization engine 418, a system optimization engine 420, a settings application simulator 422 and lab data 424. In other examples fewer or additional blocks may be used to describe the functionality of the automated audio tuning system 400.

The setup file 402 may be a file stored in memory. Alternatively, or in addition, the setup file 402 may be implemented in a graphical user interface as a receiver of information entered by an audio system designer. The setup file 402 may be configured by an audio system designer with configuration information to specify the particular audio system to be tuned, and design parameters related to the automated tuning process.

Automated operation of the automated audio tuning system 400 to determine the design parameters for a specific audio system installed in a listening space may be preceded by entering the configuration of the audio system of interest into the setup file 402. Configuration information and settings may include, for example, the number of transducers, the number of listening locations, the number of input audio signals, the number of output audio signals, the processing to obtain the output audio signals from the input audio signals, (such as stereo signals to surround signals) and/or any other audio system specific information useful to perform automated configuration of design parameters. In addition, configuration information in the setup file 402 may include design parameters such as constraints, weighting factors, automated tuning parameters, determined variables, etc., that are determined by the audio system designer.

For example, a weighting factor may be determined for each listening location with respect to the installed audio system. The weighting factor may be determined by an audio system designer based on a relative importance of each listening location. For example, in a vehicle, the driver listen location may have a highest weighting factor. The front passenger listening location may have a next highest weighting factor, and the rear passengers may have a lower weighting factor. The weighting factor may be entered into a weighting matrix included in the setup file 402 using the user interface. Further, example configuration information may include entry of information for the limiter and the gain blocks, or any other information related to any aspect of automated tuning of audio systems. An example listing of configuration information for an example setup file is included as Appendix A. In other examples, the setup file may include additional or less configuration information.

In addition to definition of the audio system architecture and configuration of the design parameters, channel mapping of the input channels, steered channels, and amplified output channels may be performed with the setup file 402. In addition, any other configuration information may be provided in the setup file 402 as previously and later discussed. Following download of the setup information into the audio system to be tuned over the parameter interface 316 (FIG. 3), setup, calibration and measurement with audio sensors 320 (FIG. 3) of the audible sound output by the audio system to be tuned may be performed.

The measurement interface 404 may receive and/or process input audio signals provided from the audio system being tuned. The measurement interface 404 may receive signals from audio sensors, the reference signals and the waveform generation data previously discussed with reference to FIG. 3. The received signals representative of response data of the loudspeakers may be stored in the transfer function matrix 406.

The transfer function matrix 406 may be a multi-dimensional response matrix containing response related information. In one example, the transfer function matrix 406, or response matrix, may be a three-dimensional response matrix that includes the number of audio sensors, the number of amplified output channels, and the transfer functions descriptive of the output of the audio system received by each of the audio sensors. The transfer functions may be the impulse response or complex frequency response measured by the audio sensors. The lab data 424 may be measured loudspeaker transfer functions (loudspeaker response data) for the loudspeakers in the audio system to be tuned. The loudspeaker response data may have been measured and collected in listening space that is a laboratory environment, such as an anechoic chamber. The lab data 424 may be stored in the form of a multi-dimensional response matrix containing response related information. In one example, the lab data 424 may be a three-dimensional response matrix similar to the transfer function matrix 406.

Figure 5:
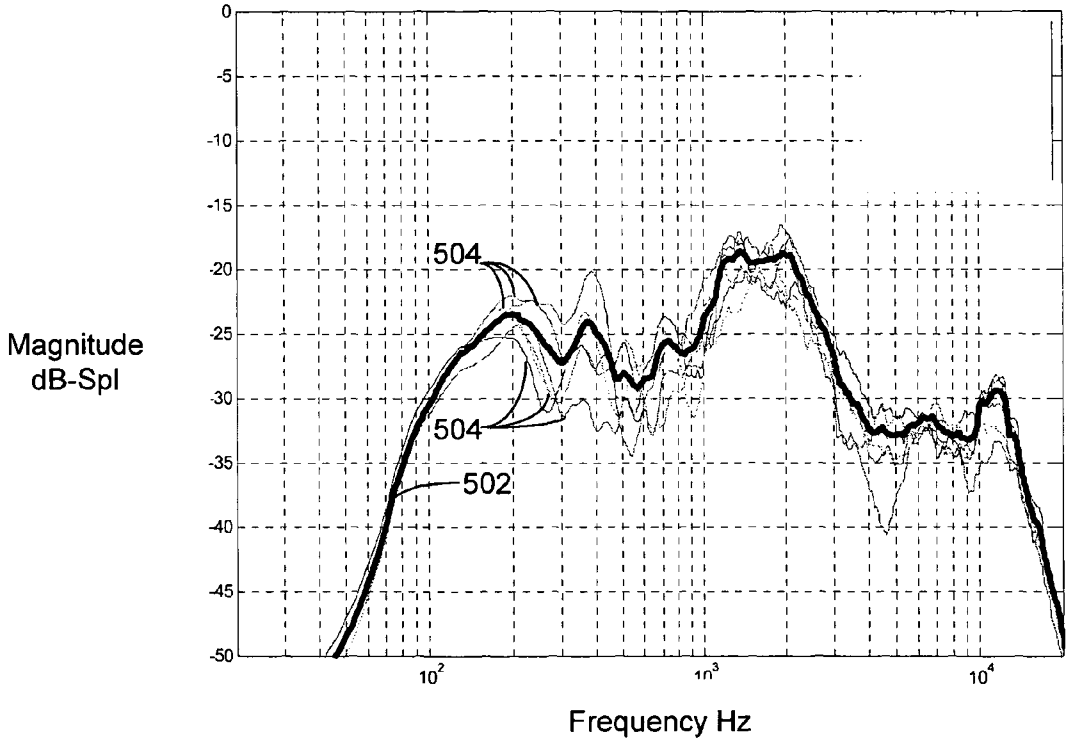
FIG. 5 is an impulse response diagram illustrating spatial averaging.

The spatial averaging engine 408 may be executed to compress the transfer function matrix 406 by averaging one or more of the dimensions in the transfer function matrix 406. For example, in the described three-dimensional response matrix, the spatial averaging engine 408 may be executed to average the audio sensors and compress the response matrix to a two-dimensional response matrix. FIG. 5 illustrates an example of spatial averaging to reduce impulse responses from six audio sensor signals 502 to a single spatially averaged response 504 across a range of frequencies. Spatial averaging by the spatial averaging engine 408 also may include applying the weighting factors. The weighting factors may be applied during generation of the spatially averaged responses to weight, or emphasize, identified ones of the impulse responses being spatially averaged based on the weighting factors. The compressed transfer function matrix may be generated by the spatial averaging engine 408 and stored in a memory 430 of the settings application simulator 422.

In FIG. 4, the amplified channel equalization engine 410 may be executed to generate channel equalization settings for the channel equalization block 222 of FIG. 2. The channel equalization settings generated by the amplified channel equalization engine 410 may correct the response of a loudspeaker or group of loudspeakers that are on the same amplified output channel. These loudspeakers may be individual, passively crossed over, or separately actively crossed-over. The response of these loudspeakers, irrespective of the listening space, may not be optimal and may require response correction.

Figure 6:
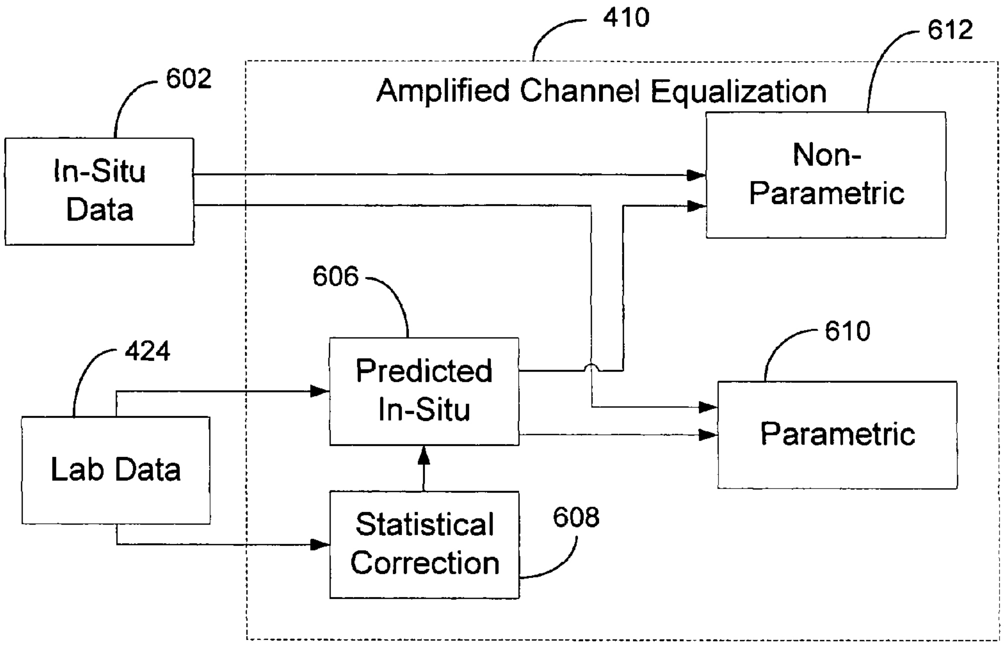
FIG. 6 is a block diagram of an example amplified channel equalization engine that may be included in the automated audio tuning system of FIG. 4.

FIG. 6 is a block diagram of an example amplified channel equalization engine 410, in-situ data 602, and lab data 424. The amplified channel equalization engine 410 may include a predicted in situ module 606, a statistical correction module 608, a parametric engine 610, and a non-parametric engine 612. In other examples, the functionality of the amplified channel equalization engine 410 may be described with fewer or additional blocks.

The in-situ data 602 may be representative of actual measured loudspeaker transfer functions in the form of complex frequency responses or impulse responses for each amplified audio channel of an audio system to be tuned. The in-situ data 602 may be measured audible output from the audio system when the audio system is installed in the listening space in a desired configuration. Using the audio sensors, the in-situ data may be captured and stored in the transfer function matrix 406 (FIG. 4). In one example, the in-situ data 602 is the compressed transfer function matrix stored in the memory 430. Alternatively, as discussed later, the in-situ data 602 may be a simulation that includes data representative of the response data with generated and/or determined settings applied thereto. The lab data 424 may be loudspeaker transfer functions (loudspeaker response data) measured in a laboratory environment for the loudspeakers in the audio system to be tuned.

Automated correction with the amplified channel equalization engine 410 of each of the amplified output channels may be based on the in-situ data 602 and/or the lab data 424. Thus, use by the amplified channel equalization engine 410 of in-situ data 602, lab data 424 or some combination of both in-situ data 602 and lab data 424 is configurable by an audio system designer in the setup file 402 (FIG. 4).

Generation of channel equalization settings to correct the response of the loudspeakers may be performed with the parametric engine 610 or the non-parametric engine 612, or a combination of both the parametric engine 610 and the non-parametric engine 612. An audio system designer may designate with a setting in the setup file 402 (FIG. 4) whether the channel equalization settings should be generated with the parametric engine 610, the non-parametric engine 612, or some combination thereof. For example, the audio system designer may designate in the setup file 402 (FIG. 2) the number of parametric filters, and the number of non-parametric filters to be included in the channel equalization block 222 (FIG. 2).

A system consisting of loudspeakers can only perform as well as the loudspeakers that make up the system. The amplified channel equalization engine 410 may use information about the performance of a loudspeaker in-situ, or in a lab environment, to correct or minimize the effect of irregularities in the response of the loudspeaker.

Channel equalization settings generated based on the lab data 424 may include processing with the predicted in-situ module 606. Since the lab based loudspeaker performance is not from the in-situ listening space in which the loudspeaker will be operated, the predicted in-situ module 606 may generate a predicted in-situ response. The predicted in-situ response may be based on audio system designer defined parameters in the setup file 402. For example, the audio system designer may create a computer model of the loudspeaker(s) in the intended environment or listening space. The computer model may be used to predict the frequency response that would be measured at each sensor location. This computer model may include important aspects to the design of the audio system. In one example, those aspects that are considered unimportant may be omitted. The predicted frequency response information of each of the loudspeaker(s) may be spatially averaged across sensors in the predicted in-situ module 606 as an approximation of the response that is expected in the listening environment. The computer model may use the finite element method, the boundary element method, ray tracing or any other method of simulating the acoustic performance of a loudspeaker or set of loudspeakers in an environment.

Based on the predicted in-situ response, the parametric engine 610 and/or the non-parametric engine 612 may generate channel equalization settings to compensate for correctable irregularities in the loudspeakers. The actual measured in-situ response may not be used since the in-situ response may obscure the actual response of the loudspeaker. The predicted in-situ response may include only factors that modify the performance of the speaker(s) by introducing a change in acoustic radiation impedance. For example, a factor(s) may be included in the in-situ response in the case where a the loudspeaker is to be placed near a boundary.

In order to obtain satisfactory results with the predicted in-situ response generated by the parametric engine 610 and/or the non-parametric engine 612, the loudspeakers should be designed to give optimal anechoic performance before being subjected to the listening space. In some listening spaces, compensation may be unnecessary for optimal performance of the loudspeakers, and generation of the channel equalization settings may not be necessary. The channel equalization settings generated by the parametric engine 610 and/or the non-parametric engine 612 may be applied in the channel equalization block 222 (FIG. 2). Thus, the signal modifications due to the channel equalization settings may affect a single loudspeaker or a (passively or actively) filtered array of loudspeakers.

In addition, statistical correction may be applied to the predicted in-situ response by the statistical correction module 608 based on analysis of the lab data 424 (FIG. 4) and/or any other information included in the setup file 402 (FIG. 4). The statistical correction module 608 may generate correction of a predicted in-situ response on a statistical basis using data stored in the setup file 402 that is related to the loudspeakers used in the audio system. For example, a resonance due to diaphragm break up in a loudspeaker may be dependent on the particulars of the material properties of the diaphragm and the variations in such material properties. In addition, manufacturing variations of other components and adhesives in the loudspeaker, and variations due to design and process tolerances during manufacture can affect performance. Statistical information obtained from quality testing/checking of individual loudspeakers may be stored in the lab data 424 (FIG. 4). Such information may be used by the statistical correction module 608 to further correct the response of the loudspeakers based on these known variations in the components and manufacturing processes. Targeted response correction may enable correction of the response of the loudspeaker to account for changes made to the design and/or manufacturing process of a loudspeaker.

In another example, statistical correction of the predicted in-situ response of a loudspeaker also may be performed by the statistical correction module 608 based on end of assembly line testing of the loudspeakers. In some instances, an audio system in a listening space, such as a vehicle, may be tuned with a given set of optimal speakers, or with an unknown set of loudspeakers that are in the listening space at the time of tuning. Due to statistical variations in the loudspeakers, such tuning may be optimized for the particular listening space, but not for other loudspeakers of the same model in the same listening space. For example, in a particular set of speakers in a vehicle, a resonance may occur at 1 kHz with a magnitude and filter bandwidth (Q) of three and a peak of 6 dB. In other loudspeakers of the same model, the occurrence of the resonance may vary over ⅓ octave, Q may vary from 2.5 to 3.5, and peak magnitude may vary from 4 to 8 dB. Such variation in the occurrence of the resonance may be provided as information in the lab data 424 (FIG. 4) for use by the amplified channel equalization engine 410 to statistically correct the predicted in situ-response of the loudspeakers.

The predicted in-situ response data or the in-situ data 602 may be used by either the parametric engine 610 or the non-parametric engine 612. The parametric engine 610 may be executed to obtain a bandwidth of interest from the response data stored in the transfer function matrix 406 (FIG. 4). Within the bandwidth of interest, the parametric engine 610 may scan the magnitude of a frequency response for peaks. The parametric engine 610 may identify the peak with the greatest magnitude and calculate the best fit parameters of a parametric equalization (e.g. center frequency, magnitude and Q) with respect to this peak. The best fit filter may be applied to the response in a simulation and the process may be repeated by the parametric engine 610 until there are no peaks greater than a specified minimum peak magnitude, such as 2 dB, or a specified maximum number of filters are used, such as two. The minimum peak magnitude and maximum number of filters may be specified by an audio system designer in the setup file 402 (FIG. 4).

The parametric engine 610 may use the weighted average across audio sensors of a particular loudspeaker, or set of loudspeakers, to treat resonances and/or other response anomalies with filters, such as parametric notch filters. For example, a center frequency, magnitude and filter bandwidth (Q) of the parametric notch filters may be generated. Notch filters may be minimum phase filters that are designed to give an optimal response in the listening space by treating frequency response anomalies that may be created when the loudspeakers are driven.

The non-parametric engine 612 may use the weighted average across audio sensors of a particular loudspeaker, or set of loudspeakers, to treat resonances and other response anomalies with filters, such as bi-quad filters. The coefficients of the bi-quad filters may be computed to provide an optimal fit to the frequency response anomaly(s). Non-parametrically derived filters can provide a more closely tailored fit when compared to parametric filters since non-parametric filters can include more complex frequency response shapes than can traditional parametric notch filters. The disadvantage to these filters is that they are not intuitively adjustable as they do not have parameters such as center frequency, Q and magnitude.

The parametric engine 610 and/or the non-parametric engine 612 may analyze the influence that each loudspeaker plays in the in-situ or lab response, not complex interactions between multiple loudspeakers producing the same frequency range. In many cases the parametric engine 610 and/or the non-parametric engine 612 may determine that it is desirable to filter the response somewhat outside the bandwidth in which the loudspeaker operates. This would be the case if, for example, a resonance occurs at one half octave above the specified low pass frequency of a given loudspeaker, as this resonance could be audible and could cause difficulty with crossover summation. In another example, the amplified channel equalization engine 410 may determine that filtering one octave below the specified high pass frequency of a loudspeaker and one octave above the specified low pass frequency of the loudspeaker may provide better results than filtering only to the band edges.

The selection of the filtering by the parametric engine 610 and/or the non-parametric engine 612 may be constrained with information included in the setup file 402. Constraining of parameters of the filter optimization (not only frequency) may be important to the performance of the amplified channel equalization engine 410 in optimization. Allowing the parametric engine 610 and/or the non-parametric engine 612 to select any unconstrained value could cause the amplified channel equalization engine 410 to generate an undesirable filter, such as a filter with very high positive gain values. In one example, the setup file 402 may include information to constrain the gain generated with the parametric engine 610 to a determined range, such as within −12 dB and +6 dB. Similarly, the setup file 402 may include a determined range to constrain generation of the magnitude and filter bandwidth (Q), such as within a range of about 0.5 to about 5 for example.

The minimum gain of a filter also may be set as an additional parameter in the setup file 402. The minimum gain may be set at a determined value such as 2 dB. Thus, any filter that has been calculated by the parametric engine 610 and/or the non-parametric engine 612 with a gain of less than 2 dB may be removed and not downloaded to the audio system being tuned. In addition, generation of a maximum number of filters by the parametric engine 610 and/or the non-parametric engine 612 may be specified in the setup file 402 to optimize system performance. The minimum gain setting may enable further advances in system performance when the parametric engine 610 and/or the non-parametric engine 612 generate the maximum number of filters specified in the setup file 402 and then remove some of the generated filters based on the minimum gain setting. When considering removal of a filter, the parametric and/or non-parametric engines 610 and 612 may consider the minimum gain setting of the filter in conjunction with the Q of the filter to determine the psychoacoustic importance of that filter in the audio system. Such removal considerations of a filter may be based on a predetermined threshold, such as a ratio of the minimum gain setting and the Q of the filter, a range of acceptable values of Q for a given gain setting of the filter, and/or a range of acceptable gain for a given Q of the filter. For example, if the Q of the filter is very low, such as 1, a 2 dB magnitude of gain in the filter can have a significant effect on the timber of the audio system, and the filter should not be deleted. The predetermined threshold may be included in the setup file 402 (FIG. 4).

In FIG. 4, the channel equalization settings generated with the amplified channel equalization engine 410 may be provided to the settings application simulator 422. The settings application simulator 422 may include the memory 430 in which the equalization settings may be stored. The setting application simulator 422 also may be executable to apply the channel equalization settings to the response data included in the transfer function matrix 406. The response data that has been equalized with the channel equalization settings also may be stored in the memory 430 as a simulation of equalized channel response data. In addition, any other settings generated with the automated audio tuning system 400 may be applied to the response data to simulate the operation of the audio system with the generated channel equalization settings applied. Further, settings included in the setup file 402 by an audio system designer may be applied to the response data based on a simulation schedule to generate a channel equalization simulation.

The simulation schedule may be included in the setup file 402. An audio system designer may designate in the simulation schedule the generated and predetermined settings used to generate a particular simulation with the settings application simulator 422. As the settings are generated by the engines in the automated audio tuning system 400, the settings application simulator 422 may generate simulations identified in the simulation schedule. For example, the simulation schedule may indicate a simulation of the response data from the transfer function matrix 406 with the equalization settings applied thereto is desired. Thus, upon receipt of the equalization settings, the settings application simulator 422 may apply the equalization settings to the response data and store the resulting simulation in the memory 430.

The simulation of the equalized response data may be available for use in the generation of other settings in the automated audio tuning system 400. In that regard, the setup file 402 also may include an order table that designates an order, or sequence in which the various settings are generated by the automated audio tuning system 400. An audio system designer may designate a generation sequence in the order table. The sequence may be designated so that generated settings used in simulations upon which it is desired to base generation of another group of generated settings may be generated and stored by the settings application simulator 422. In other words, the order table may designate the order of generation of settings and corresponding simulations so that settings generated based on simulation with other generated settings are available. For example, the simulation of the equalized channel response data may be provided to the delay engine 412. Alternatively, where channel equalization settings are not desired, the response data may be provided without adjustment to the delay engine 412. In still another example, any other simulation that includes generated settings and/or determined settings as directed by the audio system designer may be provided to the delay engine 412.

The delay engine 412 may be executed to determine and generate an optimal delay for selected loudspeakers. The delay engine 412 may obtain the simulated response of each audio input channel from a simulation stored in the memory 430 of the settings application simulator 422, or may obtain the response data from the transfer function matrix 406. By comparison of each audio input signal to the reference waveform, the delay engine 412 may determine and generate delay settings. Alternatively, where delay settings are not desired, the delay engine 412 may be omitted.

Figure 7:
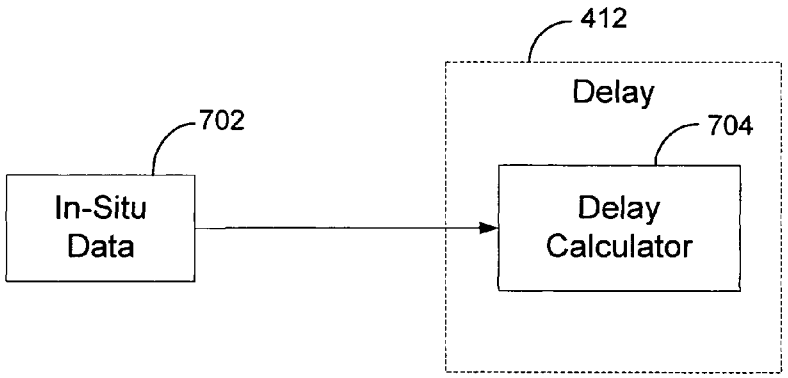
FIG. 7 is a block diagram of an example delay engine that may be included in the automated audio tuning system of FIG. 4.

FIG. 7 is a block diagram of an example delay engine 412 and in-situ data 702. The delay engine 412 includes a delay calculator module 704. Delay values may be computed and generated by the delay calculator module 704 based on the in-situ data 702. The in-situ data 702 may be the response data included in the transfer function matrix 406. Alternatively, the in-situ data 702 may be simulation data stored in the memory 430. (FIG. 4).

The delay values may be generated by the delay calculator module 704 for selected ones of the amplified output channels. The delay calculator module 704 may locate the leading edge of the measured audio input signals and the leading edge of the reference waveform. The leading edge of the measured audio input signals may be the point where the response rises out of the noise floor. Based on the difference between the leading edge of the reference waveform and the leading edge of measured audio input signals, the delay calculator module 704 may calculate the actual delay.

Figure 8:
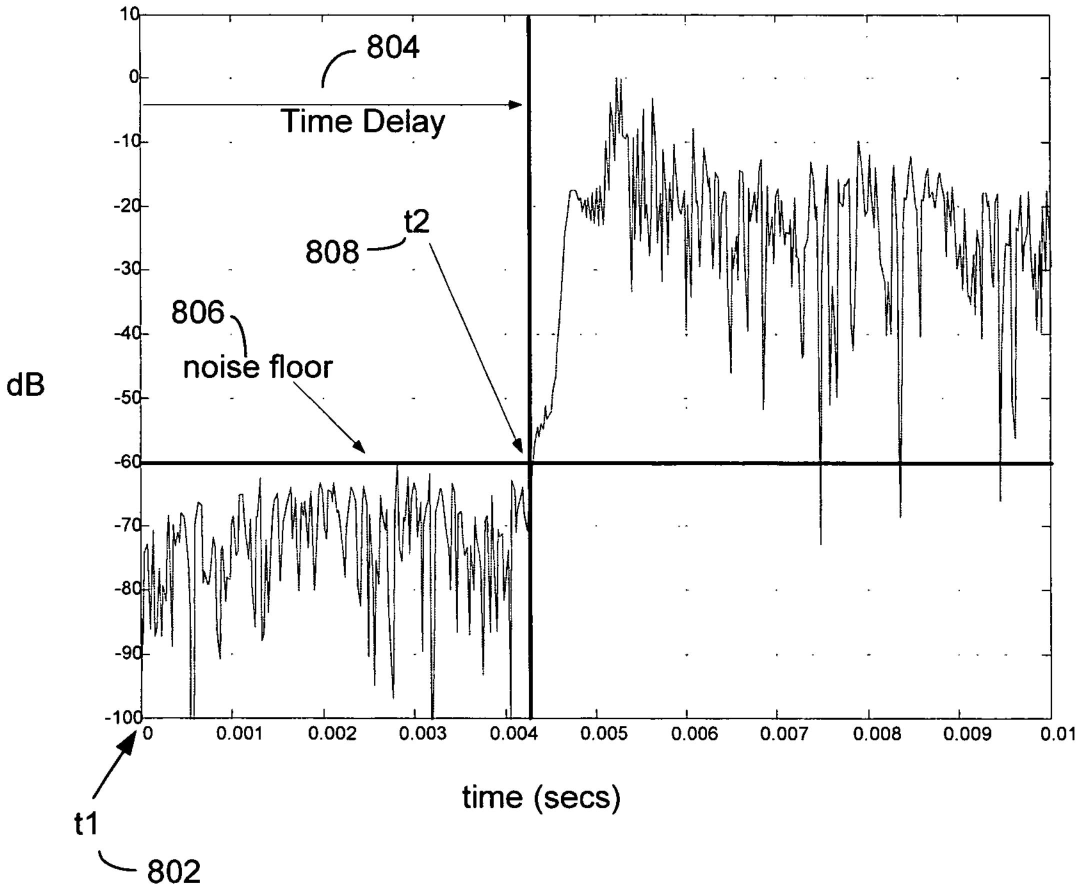
FIG. 8 is an impulse response diagram illustrating time delay.

FIG. 8 is an example impulse response illustrating testing to determine the arrival time of an audible sound at an audio sensing device, such as a microphone. At a time point (t1) 802, which equals zero seconds, the audible signal is provided to the audio system to be output by a loudspeaker. During a time delay period 804, the audible signal received by the audio sensing device is below a noise floor 806. The noise floor 806 may be a determined value included in the setup file 402 (FIG. 4). The received audible sound emerges from the noise floor 806 at a time point (t2) 808. The time between the time point (t1) 802 and the time point (t2) 808 is determined by the delay calculator module 704 as the actual delay. In FIG. 8, the noise floor 806 of the system is 60 dB below the maximum level of the impulse and the time delay is about 4.2 ms.

The actual delay is the amount of time the audio signal takes to pass through all electronics, the loudspeaker and air to reach the observation point. The actual time delay may be used for proper alignment of crossovers and for optimal spatial imaging of audible sound produced by the audio system being tuned. Different actual time delay may be present depending on which listening location in a listening space is measured with an audio sensing device. A single sensing device may be used by the delay calculator module 704 to calculate the actual delay. Alternatively, the delay calculator module 704 may average the actual time delay of two or more audio sensing devices located in different locations in a listening space, such as around a listeners head.

Based on the calculated actual delay, the delay calculator module 704 may assign weightings to the delay values for selected ones of the amplified output channels based on the weighting factors included in the setup file 402 (FIG. 4). The resulting delay settings generated by the delay calculator module 704 may be a weighted average of the delay values to each audio sensing device. Thus, the delay calculator module 704 may calculate and generate the arrival delay of audio output signals on each of the amplified audio channels to reach the respective one or more listening locations. Additional delay may be desired on some amplified output channels to provide for proper spatial impression. For example, in a multi-channel audio system with rear surround speakers, additional delay may be added to the amplified output channels driving the front loudspeakers so that the direct audible sound from the rear surround loudspeakers reaches a listener nearer the front loudspeakers at the same time.

In FIG. 4, the delay settings generated with the delay engine 412 may be provided to the settings application simulator 422. The settings application simulator 422 may store the delay settings in the memory 430. In addition, the settings application simulator 422 may generate a simulation using the delay settings in accordance with the simulation schedule included in the setup file 402. For example, the simulation schedule may indicate that a delay simulation that applies the delay settings to the equalized response data is desired. In this example, the equalized response data simulation may be extracted from the memory 430 and the delay settings applied thereto. Alternatively, where equalization settings were not generated and stored in the memory 430, the delay settings may be applied to the response data included in the transfer function matrix 406 in accordance with a delay simulation indicated in the simulation schedule. The delay simulation also may be stored in the memory 430 for use by other engines in the automated audio tuning system. For example, the delay simulation may be provided to the gain engine 414.

The gain engine 414 may be executable to generate gain settings for the amplified output channels. The gain engine 414, as indicated in the setup file 402, may obtain a simulation from the memory 430 upon which to base generation of gain settings. Alternatively, per the setup file 402, the gain engine 414 may obtain the responses from the transfer function matrix 406 in order to generate gain settings. The gain engine 414 may individually optimize the output on each of the amplified output channels. The output of the amplified output channels may be selectively adjusted by the gain engine 414 in accordance with the weighting specified in the settings file 402.

Figure 9:
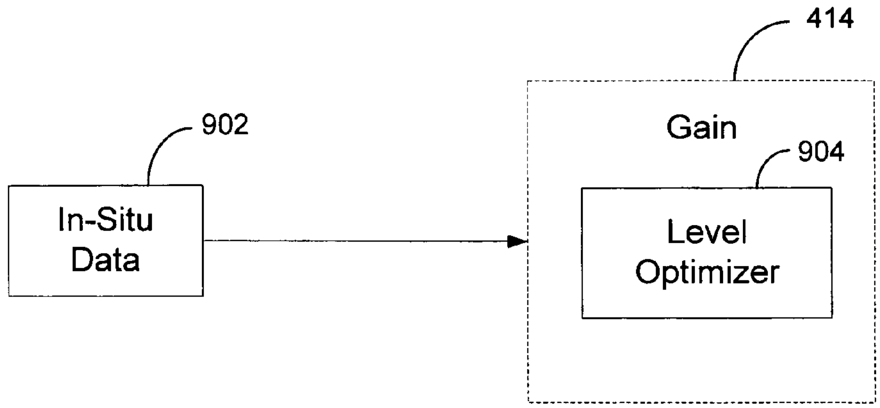
FIG. 9 is a block diagram of an example gain engine that may be included in the automated audio tuning system of FIG. 4.

FIG. 9 is a block diagram of an example gain engine 414 and in-situ data 902. The in situ data 902 may be response data from the transfer function matrix 406 that has been spatially averaged by the spatial averaging engine 408. Alternatively, the in situ data 902 may be a simulation stored in the memory 430 that includes the spatially averaged response data with generated or determined settings applied thereto. In one example, the in situ data 902 is the channel equalization simulation that was generated by the settings application simulator 422 based on the channel equalization settings stored in the memory 430.

The gain engine 414 includes a level optimizer module 904. The level optimizer module 904 may be executable to determine and store an average output level over a determined bandwidth of each amplified output channel based on the in-situ data 902. The stored average output levels may be compared to each other, and adjusted to achieve a desired level of audio output signal on each of the amplified audio channels.

The level optimizer module 904 may generate offset values such that certain amplified output channels have more or less gain than other amplified output channels. These values can be entered into a table included in the setup file 402 so that the gain engine can directly compensate the computed gain values. For example, an audio system designer may desire that the rear speakers in a vehicle with surround sound need to have increased signal level when compared to the front speakers due to the noise level of the vehicle when traveling on a road. Accordingly, the audio system designer may enter a determined value, such as +3 dB, into a table for the respective amplified output channels. In response, the level optimizer module 904, when the gain setting for those amplified output channels is generated, may add an additional 3 dB of gain to the generated values.

FIG. 4, the gain settings generated with the gain engine 414 may be provided to the settings application simulator 422. The settings application simulator 422 may store the gain settings in the memory 430. In addition, the settings application simulator 422 may, for example, apply the gain settings to the equalized or not, delayed or not, response data to generate a gain simulation. In other example gain simulations, any other settings generated with the automated audio tuning system 400, or present in the setup file 402 may be applied to the response data to simulate the operation of the audio system with the gain settings applied thereto. A simulation representative of the response data, with the equalized and/or delayed response data (if present), or any other settings, applied thereto may be extracted from the memory 430 and the gain settings applied. Alternatively, where equalization settings were not generated and stored in the memory 430, the gain settings may be applied to the response data included in the transfer function matrix 406 to generate the gain simulation. The gain simulation also may be stored in the memory 430.

The crossover engine 416 may be cooperatively operable with one or more other engines in the automated audio tuning system 10. Alternatively, the crossover engine 416 may be a standalone automated tuning system, or be operable with only select ones of the other engines, such as the amplified channel equalization engine 410 and/or the delay engine 412. The crossover engine 416 may be executable to selectively generate crossover settings for selected amplifier output channels. The crossover settings may include optimal slope and crossover frequencies for high-pass and low-pass filters selectively applied to at least two of the amplified output channels. The crossover engine 416 may generate crossover settings for groups of amplified audio channels that maximizes the total energy produced by the combined output of loudspeakers operable on the respective amplified output channels in the group. The loudspeakers may be operable in at least partially different frequency ranges.

For example, crossover settings may be generated with the crossover engine 416 for a first amplified output channel driving a relatively high frequency loudspeaker, such as a tweeter, and a second amplified output channel driving a relatively low frequency loudspeaker, such as a woofer. In this example, the crossover engine 416 may determine a crossover point that maximizes the combined total response of the two loudspeakers. Thus, the crossover engine 416 may generate crossover settings that result in application of an optimal high pass filter to the first amplified output channel, and an optimal low pass filter to the second amplified output channel based on optimization of the total energy generated from the combination of both loudspeakers. In other examples, crossovers for any number of amplified output channels and corresponding loudspeakers of various frequency ranges may be generated by the crossover engine 416.

In another example, when the crossover engine 416 is operable as a standalone audio tuning system, the response matrix, such as the in-situ and lab response matrix may be omitted. Instead, the crossover engine 416 may operate with a setup file 402, a signal generator 310 (FIG. 3) and an audio sensor 320 (FIG. 3). In this example, a reference waveform may be generated with the signal generator 310 to drive a first amplified output channel driving a relatively high frequency loudspeaker, such as a tweeter, and a second amplified output channel driving a relatively low frequency loudspeaker, such as a woofer. A response of the operating combination of the loudspeakers may be received by the audio sensor 320. The crossover engine 416 may generate a crossover setting based on the sensed response. The crossover setting may be applied to the first and second amplified output channels. This process may be repeated and the crossover point (crossover settings) moved until the maximal total energy from both of the loudspeakers is sensed with the audio sensor 320.

The crossover engine 416 may determine the crossover settings based on initial values entered in the setup file 402. The initial values for band limiting filters may be approximate values that provide loudspeaker protection, such as tweeter high pass filter values for one amplified output channel and subwoofer low pass filter values for another amplified output channel. In addition, not to exceed limits, such as a number of frequencies and slopes (e.g. five frequencies, and three slopes) to be used during automated optimization by the crossover engine 416 may be specified in the setup file 402. Further, limits on the amount of change allowed for a given design parameter may be specified in the setup file 402. Using response data and the information from the setup file 402, the crossover engine 416 may be executed to generate crossover settings.

Figure 10:
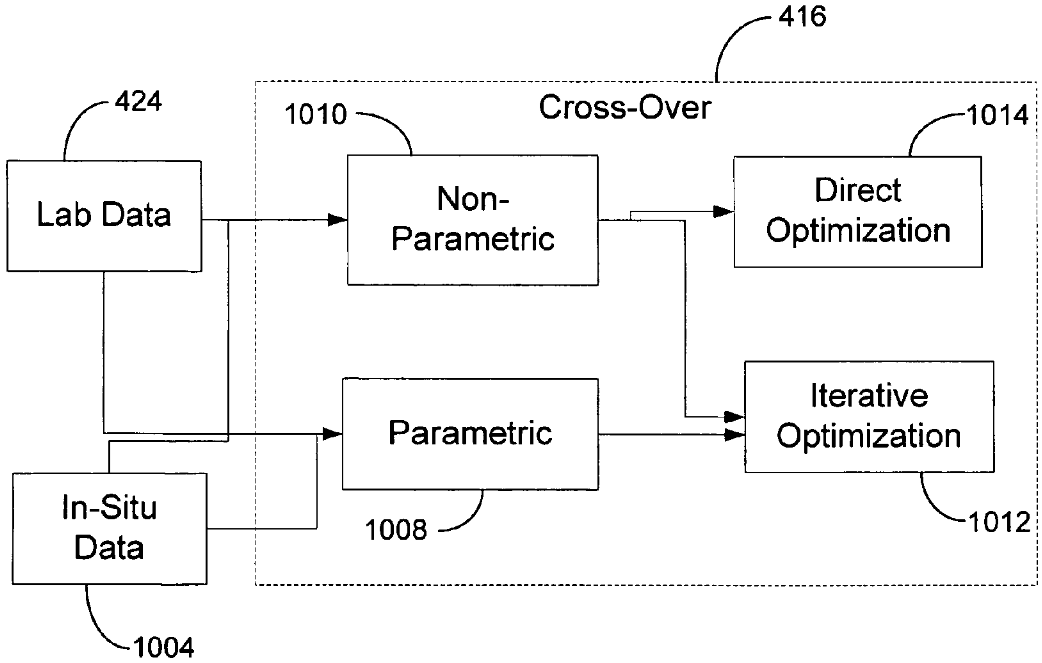
FIG. 10 is a block diagram of an example crossover engine that may be included in the automated audio tuning system of FIG. 4.

FIG. 10 is a block diagram of an example of the crossover engine 416, lab data 424 (FIG. 4), and in-situ data 1004. The lab data 424 may be measured loudspeaker transfer functions (loudspeaker response data) that were measured and collected in a laboratory environment for the loudspeakers in the audio system to be tuned. In another example, the lab data 424 may be omitted. The in-situ data 1004 may be measure response data, such as the response data stored in the transfer function matrix 406 (FIG. 4). Alternatively, the in-situ data 1004 may be a simulation generated by the settings application simulator 422 and stored in the memory 430. In one example, a simulation with the delaying settings applied is used as the in-situ data 1004. Since the phase of the response data may be used to determine crossover settings, the response data may not be spatially averaged.

The crossover engine 416 may include a parametric engine 1008 and a non-parametric engine 1010. Accordingly, the crossover engine 416 may selectively generate crossover settings for the amplified output channels with the parametric engine 1008 or the non-parametric engine 1010, or a combination of both the parametric engine 1008 and the non-parametric engine 1010. In other examples, the crossover engine 416 may include only the parametric engine 1008, or the non-parametric engine 1010. An audio system designer may designate in the setup file 402 (FIG. 4) whether the crossover settings should be generated with the parametric engine 1008, the non-parametric engine 1010, or some combination thereof. For example, the audio system designer may designate in the setup file 402 (FIG. 4) the number of parametric filters, and the number of non-parametric filters to be included in the crossover block 220 (FIG. 2).

The parametric engine 1008 or the non-parametric engine 1010 may use either the lab data 424, and/or the in-situ data 1004 to generate the crossover settings. Use of the lab data 424 or the in-situ data 1004 may be designated by an audio system designer in the setup file 402 (FIG. 4). Following entry of initial values for band-limiting filters (where needed) and the user specified limits, the crossover engine 416 may be executed for automated processing. The initial values and the limits may be entered into the setup file 402, and downloaded to the signal processor prior to collecting the response data.

The crossover engine 416 also may include an iterative optimization engine 1012 and a direct optimization engine 1014. In other examples, the crossover engine 416 may include only the iterative optimization engine 1012 or the direct optimization engine 1014. The iterative optimization engine 1012 or the direct optimization engine 1014 may be executed to determine and generate one or more optimal crossovers for at least two amplified output channel. Designation of which optimization engine will be used may be set by an audio system designer with an optimization engine setting in the setup file. An optimal crossover may be one where the combined response of the loudspeakers on two or more amplified output channels subject to the crossover are about −6 dB at the crossover frequency and the phase of each speaker is about equal at that frequency. This type of crossover may be called a Linkwitz-Riley filter. The optimization of a crossover may require that the phase response of each of the loudspeakers involved have a specific phase characteristic. In other words, the phase of a low passed loudspeaker and the phase of a high passed loudspeaker may be sufficiently equal to provide summation.

The phase alignment of different loudspeakers on two or more different amplified audio channels using crossovers may be achieved with the crossover engine 416 in multiple ways. Example methods for generating the desired crossovers may include iterative crossover optimization and direct crossover optimization.

Iterative crossover optimization with the iterative optimization engine 1012 may involve the use of a numerical optimizer to manipulate the specified high pass and low pass filters as applied in a simulation to the weighted acoustic measurements over the range of constraints specified by the audio system designer in the setup file 402. The optimal response may be the one determined by the iterative optimization engine 1012 as the response with the best summation. The optimal response is characterized by a solution where the sum of the magnitudes of the input audio signals (time domain) driving at least two loudspeakers operating on at least two different amplified output channels is equal to the complex sum (frequency domain), indicating that the phase of the loudspeaker responses are sufficiently optimal over the crossover range.

Complex results may be computed by the iterative optimization engine 1012 for the summation of any number of amplified audio channels having complimentary high pass/low pass filters that form a crossover. The iterative optimization engine 1012 may score the results by overall output and how well the amplifier output channels sum as well as variation from audio sensing device to audio sensing device. A "perfect" score may yield six dB of summation of the responses at the crossover frequency while maintaining the output levels of the individual channels outside the overlap region at all audio sensing locations. The complete set of scores may be weighted by the weighting factors included in the setup file 402 (FIG. 4). In addition, the set of scores may be ranked by a linear combination of output, summation and variation.

To perform the iterative analysis, the iterative optimization engine 1012 may generate a first set of filter parameters, or crossover settings. The generated crossover settings may be provided to the setting application simulator 422. The setting application simulator 422 may simulate application of the crossover settings to two or more loudspeakers on two or more respective audio output channels of the simulation previously used by the iterative optimization engine 1012 to generate the settings. A simulation of the combined total response of the corresponding loudspeakers with the crossover settings applied may be provided back to the iterative optimization engine 1012 to generate a next iteration of crossover settings. This process may be repeated iteratively until the sum of the magnitudes of the input audio signals that is closest to the complex sum is found.

The iterative optimization engine 1012 also may return a ranked list of filter parameters. By default, the highest ranking set of crossover settings may be used for each of the two or more respective amplified audio channels. The ranked list may be retained and stored in the setup file 402 (FIG. 4). In cases where the highest ranking crossover settings are not optimal based on subjective listening tests, lower ranked crossover settings may be substituted. If the ranked list of filtered parameters is completed without crossover settings to smooth the response of each individual amplified output channel, additional design parameters for filters can be applied to all the amplified output channels involved to preserve phase relationships. Alternatively, an iterative process of further optimizing crossovers settings after the crossover settings determined by the iterative optimization engine 1012 may be applied by the iterative optimization engine 1012 to further refine the filters.

Using iterative crossover optimization, the iterative optimization engine 1012 may manipulate the cutoff frequency, slope and Q for the high pass and low pass filters generated with the parametric engine 1008. Additionally, the iterative optimization engine 1012 may use a delay modifier to slightly modify the delay of one or more of the loudspeakers being crossed, if needed, to achieve optimal phase alignment. As previously discussed, the filter parameters provided with the parametric engine 1008 may be constrained with determined values in the setup file 402 (FIG. 4) such that the iterative optimization engine 1012 manipulates the values within a specified range.

Such constraints may be necessary to ensure the protection of some loudspeakers, such as small speakers where the high pass frequency and slope need to be generated to protect the loudspeaker from mechanical damage. For example, for a 1 kHz desired crossover, the constraints might be ⅓ octave above and below this point. The slope may be constrained to be 12 dB/octave to 24 dB/octave and Q may be constrained to 0.5 to 1.0. Other constraint parameters and/or ranges also may be specified depending on the audio system being tuned. In another example, a 24 dB/octave filter at 1 kHz with a Q=0.7 may be required to adequately protect a tweeter loudspeaker. Also, constraints may be specified by an audio system designer to allow the iterative optimization engine 1012 to only increase or decrease parameters, such as constraints to increase frequency, increase slope, or decrease Q from the values generated with the parametric engine 1008 to ensure that the loudspeaker is protected.

A more direct method of crossover optimization is to directly calculate the transfer function of the filters for each of the two or more amplified output channels to optimally filter the loudspeaker for "ideal" crossover with the direct optimization engine 1014. The transfer functions generated with the direct optimization engine 1014 may be synthesized using the non-parametric engine 1010 that operates similar to the previously described non-parametric engine 612 (FIG. 6) of the amplified channel equalization engine 410 (FIG. 4). Alternatively, the direct optimization engine 1014 may use the parametric engine 1008 to generate the optimum transfer functions. The resulting transfer functions may include the correct magnitude and phase response to optimally match the response of a Linkwitz-Riley, Butterworth or other desired filter type.

Figure 11:
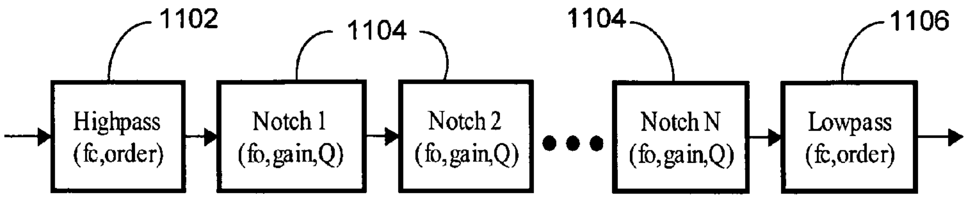
FIG. 11 is a block diagram of an example of a chain of parametric cross over and notch filters that may be generated with the automated audio tuning system of FIG. 4.

FIG. 11 is an example filter block that may be generated by the automated audio tuning system for implementation in an audio system. The filter block is implemented as a filter bank with a processing chain that includes a high-pass filter 1102, N-number of notch filters 1104, and a low-pass filter 1106. The filters may be generated with the automated audio tuning system based on either in-situ data, or lab data 424 (FIG. 4). In other examples, only the high and low pass filters 1102 and 1106 may be generated.

FIG. 11, the high-pass and low-pass filters 1102 and 1106, the filter design parameters include the crossover frequencies (fc) and the order (or slope) of each filter. The high-pass filter 1102 and the low-pass filter 1106 may be generated with the parametric engine 1008 and iterative optimization engine 1012 (FIG. 10) included in the crossover engine 416. The high-pass filter 1102 and the low-pass filter 1106 may be implemented in the crossover block 220 (FIG. 2) on a first and second audio output channel of an audio system being tuned. The high-pass and low-pass filters 1102 and 1106 may limit the respective audio signals on the first and second output channels to a determined frequency range, such as the optimum frequency range of a respective loudspeaker being driven by the respective amplified output channel, as previously discussed.

The notch filters 1104 may attenuate the audio input signal over a determined frequency range. The filter design parameters for the notch filters 1104 may each include an attenuation gain (gain), a center frequency (f0), and a quality factor (Q). The N-number of notch filters 1104 may be channel equalization filters generated with the parametric engine 610 (FIG. 6) of the amplified channel equalization engine 410. The notch filters 1104 may be implemented in the channel equalization block 222 (FIG. 2) of an audio system. The notch filters 1104 may be used to compensate for imperfections in the loudspeaker and compensate for room acoustics as previously discussed.

All of the filters of FIG. 11 may be generated with automated parametric equalization as requested by the audio system designer in the setup file 402 (FIG. 4). Thus, the filters depicted in FIG. 11 represent a completely parametric optimally placed signal chain of filters. Accordingly, the filter design parameters may be intuitively adjusted by an audio system designer following generation.

Figure 12:
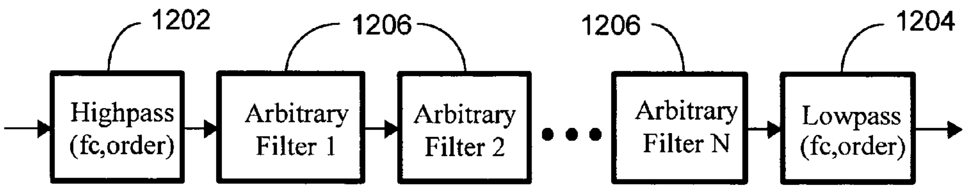
FIG. 12 is a block diagram of an example of a plurality of parametric cross over filters, and non-parametric arbitrary filters that may be generated with the automated audio tuning system of FIG. 4.

FIG. 12 is another example filter block that maybe generated by the automated audio tuning system for implementation in an audio system. The filter block of FIG. 12 may provide a more flexibly designed filter processing chain. In FIG. 12, the filter block includes a high-pass filter 1202, a low pass filter 1204 and a plurality (N) of arbitrary filters 1206 there between. The high-pass filter 1202 and the low-pass filter 1204 may be configured as a crossover to limit audio signals on respective amplified output channels to an optimum range for respective loudspeakers being driven by the respective amplified audio channel on which the respective audio signals are provided. In this example, the high-pass filter 1202 and the low pass filter 1204 are generated with the parametric engine 1008 (FIG. 10) to include the filter design parameters of the crossover frequencies (fc) and the order (or slope). Thus, the filter design parameters for the crossover settings are intuitively adjustable by an audio system designer.

The arbitrary filters 1206 may be any form of filter, such as a biquad or a second order digital IIR filter. A cascade of second order IIR filters may be used to compensate for imperfections in a loudspeaker and also to compensate for room acoustics, as previously discussed. The filter design parameters of the arbitrary filters 1206 may be generated with the non-parametric engine 612 using either in-situ data 602 or lab data 424 (FIG. 4) as arbitrary values that allow significantly more flexibility in shaping the filters, but are not as intuitively adjustable by an audio system designer.

Figure 13:
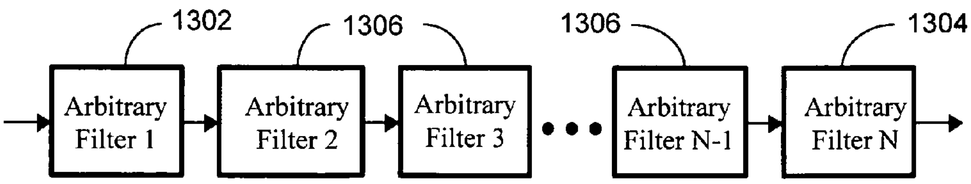
FIG. 13 is a block diagram of an example of a plurality of arbitrary filters that may be generated with the automated audio tuning system of FIG. 4.

FIG. 13 is another example filter block that may be generated by the automated audio tuning system for implementation in an audio system. In FIG. 13, a cascade of arbitrary filters is depicted that includes a high pass filter 1302, a low pass filter 1304 and a plurality of channel equalization filters 1306. The high pass filter 1302 and the low pass filter 1304 may be generated with the non-parametric engine 1010 (FIG. 10) and used in the crossover block 220 (FIG. 2) of an audio system. The channel equalization filters 1306 may be generated with the non-parametric engine 612 (FIG. 6) and used in the channel equalization block 222 (FIG. 2) of an audio system. Since the filter design parameters are arbitrary, adjustment of the filters by an audio system designer would not be intuitive, however, the shape of the filters could be better customized for the specific audio system being tuned.

In FIG. 4, the bass optimization engine 418 may be executed to optimize summation of audible low frequency sound waves in the listening space. All amplified output channels that include loudspeakers that are designated in the setup file 402 as being "bass producing" low frequency speakers may be tuned at the same time with the bass optimization engine 418 to ensure that they are operating in optimal relative phase to one another. Low frequency producing loudspeakers may be those loudspeakers operating below 400 Hz. Alternatively, low frequency producing loudspeakers may be those loudspeakers operating below 150 Hz, or between 0 Hz and 150 Hz. The bass optimization engine 418 may be a stand alone automated audio system tuning system that includes the setup file 402 and a response matrix, such as the transfer function matrix 406 and/or the lab data 424. Alternatively, the bass optimization engine 418 may be cooperatively operative with one or more of the other engines, such as with the delay engine 412 and/or the crossover engine 416.

The bass optimization engine 418 is executable to generate filter design parameters for at least two selected amplified audio channels that result in respective phase modifying filters. A phase modifying filter may be designed to provide a phase shift of an amount equal to the difference in phase between loudspeakers that are operating in the same frequency range. The phase modifying filters may be separately implemented in the bass managed equalization block 218 (FIG. 2) on two or more different selected amplified output channels. The phase modifying filters may different for different selected amplified output channels depending on the magnitude of phase modification that is desired. Accordingly, a phase modifying filter implemented on one of the selected amplified output channels may provide a phase modification that is significantly larger with respect to a a phase modifying filter implemented on another of the selected amplified output channels.

Figure 14:
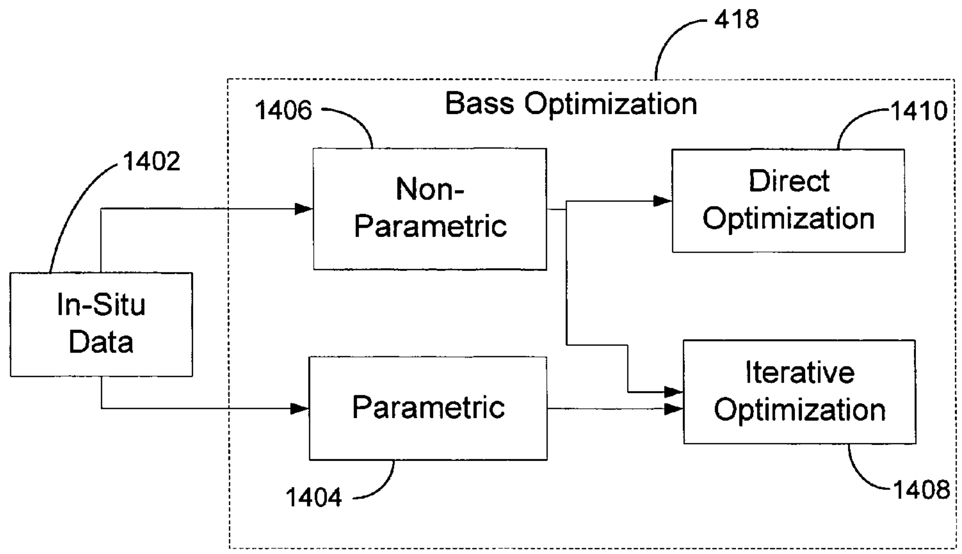
FIG. 14 is a block diagram of an example bass optimization engine that may be included in the automated audio tuning system of FIG. 4.

FIG. 14 is a block diagram that includes the bass optimization engine 418, and in-situ data 1402. The in-situ data 1402 may be response data from the transfer function matrix 406. Alternatively, the in-situ data 1402 may be a simulation that may include the response data from the transfer function matrix 406 with generated or determined settings applied thereto. As previously discussed, the simulation may be generated with the settings application simulator 422 based on a simulation schedule, and stored in memory 430 (FIG. 4).

The bass optimization engine 418 may include a parametric engine 1404 and a non-parametric engine 1406. In other examples, the bass optimization engine may include only the parametric engine 1404 or the non-parametric engine 1406. Bass optimization settings may be selectively generated for the amplified output channels with the parametric engine 1404 or the non-parametric engine 1406, or a combination of both the parametric engine 1404 and the non-parametric engine 1406. Bass optimization settings generated with the parametric engine 1404 may be in the form of filter design parameters that synthesize parametric all-pass filter for each of the selected amplified output channels. Bass optimization settings generated with the non-parametric engine 1406, on the other hand, may be in the form of filter design parameters that synthesize an arbitrary all-pass filter, such as an IIR or FIR all-pass filter for each of the selected amplified output channels.

The bass optimization engine 418 also may include an iterative bass optimization engine 1408 and a direct bass optimization engine 1410. In other examples, the bass optimization engine may include only the iterative bass optimization engine 1408 or the direct bass optimization engine 1410. The iterative bass optimization engine 1408 may be executable to compute, at each iteration, weighted spatial averages across audio sensing devices of the summation of the bass devices specified. As parameters are iteratively modified, the relative magnitude and phase response of the individual loudspeakers or pairs of loudspeakers on each of the selected respective amplified output channels may be altered, resulting in alteration of the complex summation.

The target for optimization by the bass optimization engine 418 may be to achieve maximal summation of the low frequency audible signals from the different loudspeakers within a frequency range at which audible signals from different loudspeakers overlap. The target may be the summation of the magnitudes (time domain) of each loudspeaker involved in the optimization. The test function may be the complex summation of the audible signals from the same loudspeakers based on a simulation that includes the response data from the transfer function matrix 406 (FIG. 4). Thus, the bass optimization settings may be iteratively provided to the settings application simulator 422 (FIG. 4) for iterative simulated application to the selected group of amplified audio output channels and respective loudspeakers. The resulting simulation, with the bass optimization settings applied, may be used by the bass optimization engine 418 to determine the next iteration of bass optimization settings. Weighting factors also may be applied to the simulation by the direct bass optimization engine 1410 to apply priority to one or more listening positions in the listening space. As the simulated test data approaches the target, the summation may be optimal. The bass optimization may terminate with the best possible solution within constraints specified in the setup file 402 (FIG. 4).

Alternatively, the direct bass optimization engine 1410 may be executed to compute and generate the bass optimization settings. The direct bass optimization engine 1410 may directly calculate and generate the transfer function of filters that provide optimal summation of the audible low frequency signals from the various bass producing devices in the audio system indicated in the setup file 402. The generated filters may be designed to have all-pass magnitude response characteristics, and to provide a phase shift for audio signals on respective amplified output channels that may provide maximal energy, on average, across the audio sensor locations. Weighting factors also may be applied to the audio sensor locations by the direct bass optimization engine 1410 to apply priority to one or more listening positions in a listening space.

In FIG. 4, the optimal bass optimization settings generated with the bass optimization engine 418 may be identified to the settings application simulator 422. Since the settings application simulator 422 may store all of the iterations of the bass optimization settings in the memory 430, the optimum settings may be indicated in the memory 430. In addition, the settings application simulator 422 may generate one or more simulations that includes application of the bass optimization settings to the response data, other generated settings and/or determined settings as directed by the simulation schedule stored in the setup file 402. The bass optimization simulation(s) may be stored in the memory 430, and may, for example, be provided to the system optimization engine 420.

The system optimization engine 420 may use a simulation that includes the response data, one or more of the generated settings, and/or the determined settings in the setup file 402 to generate group equalization settings to optimize groups of the amplified output channels. The group equalization settings generated by the system optimization engine 420 may be used to configure filters in the global equalization block 210 and/or the steered channel equalization block 214 (FIG. 2).

Figure 15:
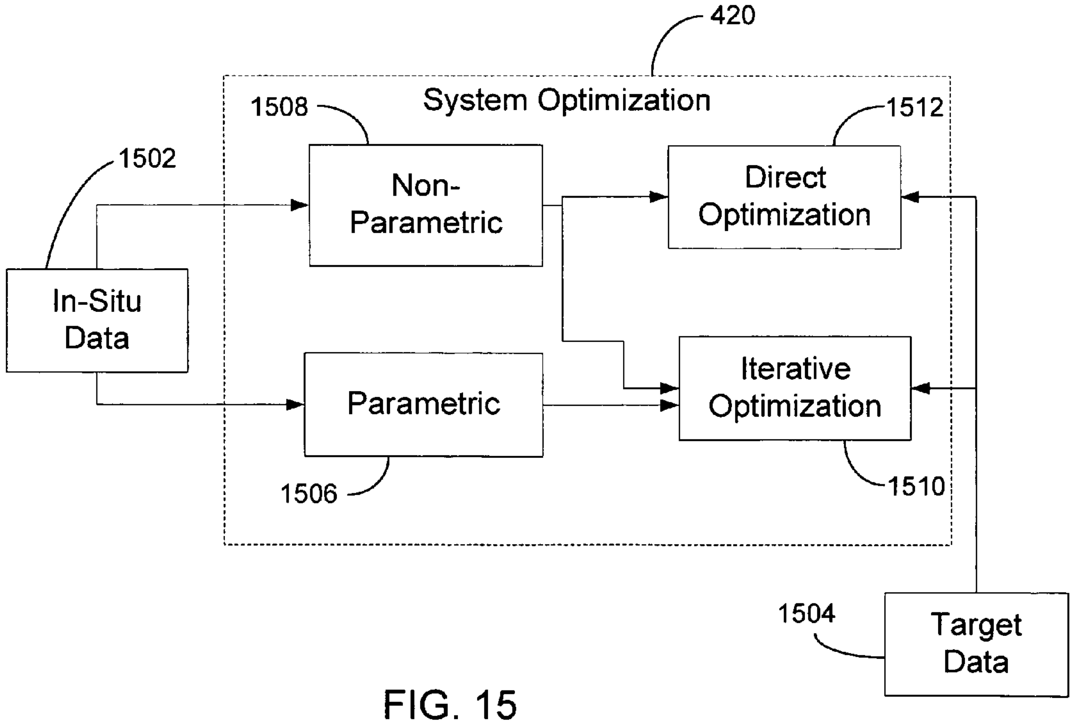
FIG. 15 is a block diagram of an example system optimization engine that may be included in the automated audio tuning system of FIG. 4.

FIG. 15 is a block diagram of an example system optimization engine 420, in-situ data 1502, and target data 1504. The in-situ data 1502 may be response data from the transfer function matrix 406. Alternatively, the in-situ data 1502 may be one or more simulations that include the response data from the transfer function matrix 406 with generated or determined settings applied thereto. As previously discussed, the simulations may be generated with the settings application simulator 422 based on a simulation schedule, and stored in memory 430 (FIG. 4).

The target data 1504 may be a frequency response magnitude that a particular channel or group of channels is targeted to have in a weighted spatial averaged sense. For example, the left front amplified output channel in an audio system may contain three or more loudspeakers that are driven with a common audio output signal provided on the left front amplified output channel. The common audio output signal may be a frequency band limited audio output signal. When an input audio signal is applied to the audio system, that is to energize the left front amplified output channel, some acoustic output is generated. Based on the acoustic output, a transfer function may be measured with an audio sensor, such as a microphone, at one or more locations in the listening environment. The measured transfer function may be spatially averaged and weighted.

The target data 1504 or desired response for this measured transfer function may include a target curve, or target function. An audio system may have one or many target curves, such as, one for every major speaker group in a system. For example, in a vehicle audio surround sound system, channel groups that may have target functions may include left front, center, right front, left side, right side, left surround and right surround. If an audio system contains a special purpose loudspeaker such as a rear center speaker for example, this also may have a target function. Alternatively, all target functions in an audio system may be the same.

Figure 16:
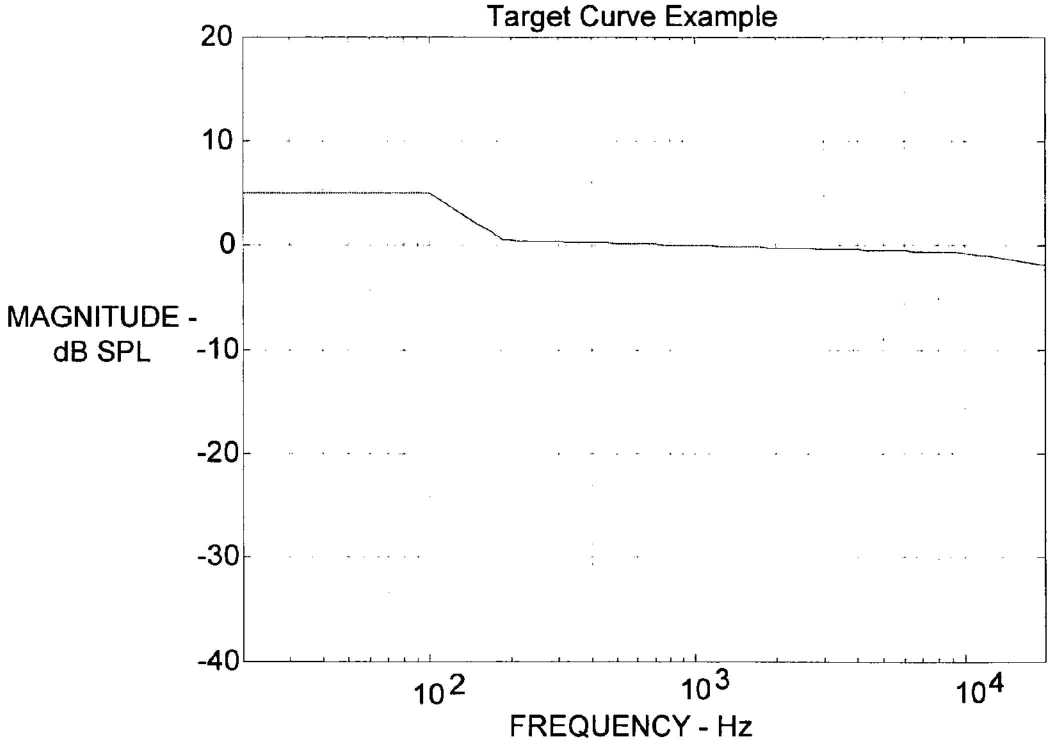
FIG. 16 is an example target response.

Target functions may be predetermined curves that are stored in the setup file 402 as target data 1504. The target functions may be generated based on lab information, in-situ information, statistical analysis, manual drawing, or any other mechanism for providing a desired response of multiple amplified audio channels. Depending on many factors, the parameters that make up a target function curve may be different. For example, an audio system designer may desire or expect an additional quantity of bass in different listening environments. In some applications the target function(s) may not be equal pressure per fractional octave, and also may have some other curve shape. An example target function curve shape is shown in FIG. 16.

The parameters that form a target function curve may be generated parametrically or non-parametrically. Parametric implementations allow an audio system designer or an automated tool to adjust parameters such as frequencies and slopes. Non-parametric implementations allow an audio system designer or an automated tool to "draw" arbitrary curve shapes.

The system optimization engine 420 may compare portions of a simulation as indicated in the setup file 402 (FIG. 4) with one or more target functions. The system optimization engine 420 may identify representative groups of amplified output channels from the simulation for comparison with respective target functions. Based on differences in the complex frequency response, or magnitude, between the simulation and the target function, the system optimization engine may generate group equalization settings that may be global equalization settings and/or steered channel equalization settings.

In FIG. 15, the system optimization engine 420 may include a parametric engine 1506 and a non-parametric engine 1508. Global equalization settings and/or steered channel equalization settings may be selectively generated for the input audio signals or the steered channels, respectively, with the parametric engine 1506 or the non-parametric engine 1508, or a combination of both the parametric engine 1506 and the non-parametric engine 1508. Global equalization settings and/or steered channel equalization settings generated with the parametric engine 1506 may be in the form of filter design parameters that synthesize a parametric filter, such as a notch, band pass, and/or all pass filter. Global equalization settings and/or steered channel equalization settings generated with the non-parametric engine 1508, on the other hand, may be in the form of filter design parameters that synthesize an arbitrary IIR or FIR filter, such as a notch, band pass, or all-pass filter.

The system optimization engine 420 also may include an iterative equalization engine 1510, and a direct equalization engine 1512. The iterative equalization engine 1510 may be executable in cooperation with the parametric engine 1506 to iteratively evaluate and rank filter design parameters generated with the parametric engine 1506. The filter design parameters from each iteration may be provided to the setting application simulator 422 for application to the simulation(s) previously provided to the system optimization engine 420. Based on comparison of the simulation modified with the filter design parameters, to one or more target curves included in the target data 1504, additional filter design parameters may be generated. The iterations may continue until a simulation generated by the settings application simulator 422 is identified with the system iterative equalization engine 1510 that most closely matches the target curve.

The direct equalization engine 1512 may calculate a transfer function that would filter the simulation(s) to yield the target curves(s). Based on the calculated transfer function, either the parametric engine 1506 or the non-parametric engine 1508 may be executed to synthesize a filter with filter design parameters to provide such filtering. Use of the iterative equalization engine 1510 or the direct equalization engine 1512 may be designated by an audio system designer in the setup file 402 (FIG. 4).

In FIG. 4, the system optimization engine 420 may use target curves and a summed response provided with the in-situ data to consider a low frequency response of the audio system. At low frequencies, such as less than 400 Hz, modes in a listening space may be excited differently by one loudspeaker than by two or more loudspeakers receiving the same audio output signal. The resulting response can be very different when considering the summed response, versus an average response, such as an average of a left front response and a right front response. The system optimization engine 420 may address these situations by simultaneously using multiple audio input signals from a simulation as a basis for generating filter design parameters based on the sum of two or more audio input signals. The system optimization engine 420 may limit the analysis to the low frequency region of the audio input signals where equalization settings may be applied to a modal irregularity that may occur across all listening positions.

The system optimization engine 420 also may provide automated determination of filter design parameters representative of spatial variance filters. The filter design parameters representative of spatial variance filters may be implemented in the steered channel equalization block 214 (FIG. 2). The system optimization engine 420 may determine the filter design parameters from a simulation that may have generated and determined settings applied. For example, the simulation may include application of delay settings, channel equalization settings, crossover settings and/or high spatial variance frequencies settings stored in the setup file 402.

When enabled, system optimization engine 420 may analyze the simulation and calculate variance of the frequency response of each audio input channel across all of the audio sensing devices. In frequency regions where the variance is high, the system optimization engine 420 may generate variance equalization settings to maximize performance. Based on the calculated variance, the system optimization engine 420 may determine the filter design parameters representative of one or more parametric filters and/or non-parametric filters. The determined design parameters of the parametric filter(s) may best fit the frequency and Q of the number of high spatial variance frequencies indicated in the setup file 402. The magnitude of the determined parametric filter(s) may be seeded with a mean value across audio sensing devices at that frequency by the system optimization engine 420. Further adjustments to the magnitude of the parametric notch filter(s) may occur during subjective listening tests.

The system optimization engine 420 also may perform filter efficiency optimization. After the application and optimization of all filters in a simulation, the overall quantity of filters may be high, and the filters may be inefficiently and/or redundantly utilized. The system optimization engine 420 may use filter optimization techniques to reduce the overall filter count. This may involve fitting two or more filters to a lower order filter and comparing differences in the characteristics of the two or more filters vs. the lower order filters. If the difference is less than a determined amount the lower order filter may be accepted and used in place of the two or more filters.

The optimization also may involve searching for filters which have little influence on the overall system performance and deleting those filters. For example, where cascades of minimum phase bi-quad filters are included, the cascade of filters also may be minimum phase. Accordingly, filter optimization techniques may be used to minimize the number of filters deployed. In another example, the system optimization engine 420 may compute or calculate the complex frequency response of the entire chain of filters applied to each amplified output channel. The system optimization engine 420 may then pass the calculated complex frequency response, with appropriate frequency resolution, to filter design software, such as FIR filter design software. The overall filter count may be reduced by fitting a lower order filter to multiple amplified output channels. The FIR filter also may be automatically converted to an IIR filter to reduce the filter count. The lower order filter may be applied in the global equalization block 210 and/or the steering channel equalization block 214 at the direction of the system optimization engine 420.

The system optimization engine 420 also may generate a maximum gain of the audio system. The maximum gain may be set based on a parameter specified in the setup file 402, such as a level of distortion. When the specified parameter is a level of distortion, the distortion level may be measured at a simulated maximum output level of the audio amplifier or at a simulated lower level. The distortion may be measured in a simulation in which all filters are applied and gains are adjusted. The distortion may be regulated to a certain value, such as 10% THD, with the level recorded at each frequency at which the distortion was measured. Maximum system gain may be derived from this information. The system optimization module 420 also may set or adjust limiter settings in the limiter block 228 (FIG. 2) based on the distortion information.

Figure 17:
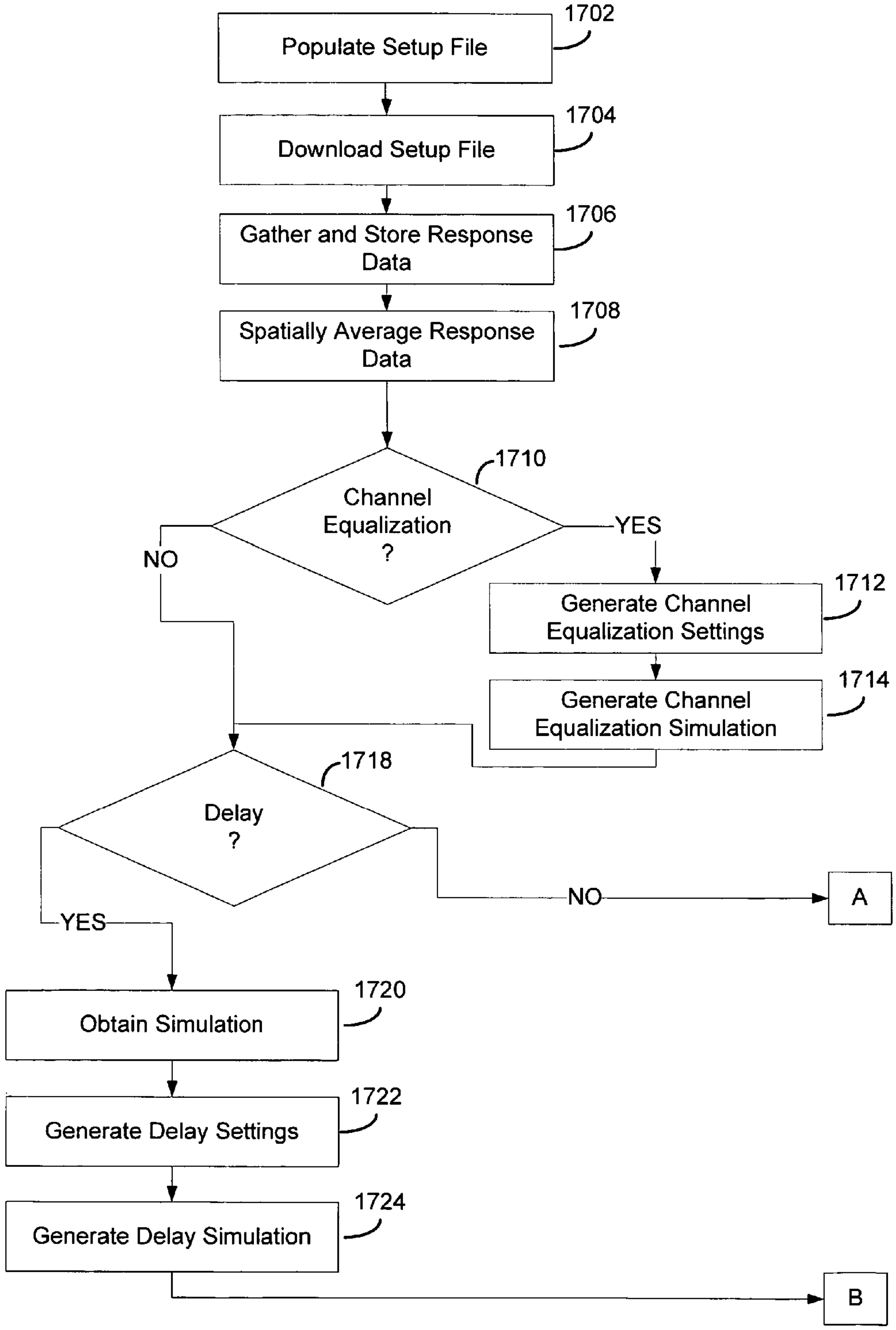
FIG. 17 is a process flow diagram illustrating example operation of the automated audio tuning system of FIG. 4.

FIG. 17 is a flow diagram describing example operation of the automated audio tuning system. In the following example, automated steps for adjusting the parameters and determining the types of filters to be used in the blocks included in the signal flow diagram of FIG. 2 will be described in a particular order. However, as previously indicated, for any particular audio system, some of the blocks described in FIG. 2 may not be implemented. Accordingly, the portions of the automated audio tuning system 400 corresponding to the unimplemented blocks may be omitted. In addition, the order of the steps may be modified in order to generate simulations for use in other steps based on the order table and the simulation schedule with the setting application simulator 422, as previously discussed. Thus, the exact configuration of the automated audio tuning system may vary depending on the implementation needed for a given audio system. In addition, the automated steps performed by the automated audio tuning system, although described in a sequential order, need not be executed in the described order, or any other particular order, unless otherwise indicated. Further, some of the automated steps may be performed in parallel, in a different sequence, or may be omitted entirely depending on the particular audio system being tuned.

In FIG. 17, at block 1702, the audio system designer may enable population of the setup file with data related to the audio system to be tested. The data may include audio system architecture, channel mapping, weighting factors, lab data, constraints, order table, simulation schedule, etc. At block 1704, the information from the setup file may be downloaded to the audio system to be tested to initially configure the audio system. At block 1706, response data from the audio system may be gathered and stored in the transfer function matrix. Gathering and storing response data may include setup, calibration and measurement with sound sensors of audible sound waves produced by loudspeakers in the audio system. The audible sound may be generated by the audio system based on input audio signals, such as waveform generation data processed through the audio system and provided as audio output signals on amplified output channels to drive the loudspeakers.

The response data may be spatially averaged and stored at block 1708. At block 1710, it is determined if amplified channel equalization is indicated in the setup file. Amplified channel equalization, if needed, may need to be performed before generation of gain settings or crossover settings. If amplified channel equalization is indicated, at block 1712, the amplified channel equalization engine may use the setup file and the spatially averaged response data to generate channel equalization settings. The channel equalization settings may be generated based on in-situ data or lab data. If lab data is used, in-situ prediction and statistical correction may be applied to the lab data. Filter parameter data may be generated based on the parametric engine, the non-parametric engine, or some combination thereof.

The channel equalization settings may be provided to the setting application simulator, and a channel equalization simulation may be generated and stored in memory at block 1714. The channel equalization simulation may be generated by applying the channel equalization settings to the response data based on the simulation schedule and any other determined parameters in the setup file.

Following generation of the channel equalization simulation at block 1714, or if amplified channel equalization is not indicated in the setup file at block 1710, it is determined if automated generation of delay settings are indicated in the setup file at block 1718. Delay settings, if needed, may be needed prior to generation of crossover settings and/or bass optimization settings. If delay settings are indicated, a simulation is obtained from the memory at block 1720. The simulation may be indicated in the simulation schedule in the setup file. In one example, the simulation obtained may be the channel equalization simulation. The delay engine may be executed to use the simulation to generate delay settings at block 1722.

Delay settings may be generated based on the simulation and the weighting matrix for the amplified output channels that may be stored in the setup file. If one listening position in the listening space is prioritized in the weighting matrix, and no additional delay of the amplified output channels is specified in the setup file, the delay settings may be generated so that all sound arrives at the one listening position substantially simultaneously. At block 1724, the delay settings may be provided to the settings application simulator, and a simulation with the delay settings applied may be generated. The delay simulation may be the channel equalization simulation with the delay settings applied thereto.

Figure 18:
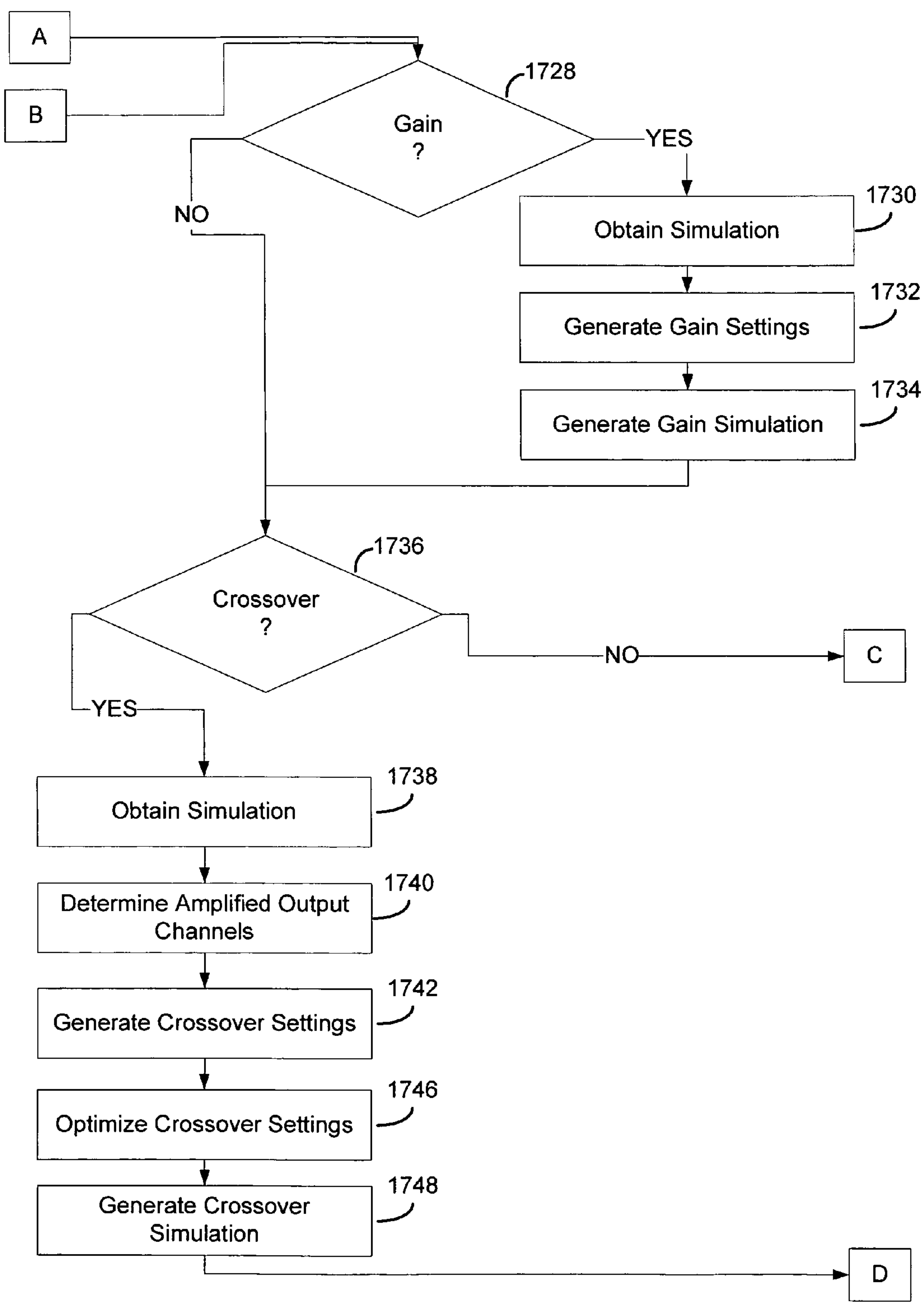
FIG. 18 is a second part of the process flow diagram of FIG. 17.

In FIG. 18, following generation of the delay simulation at block 1724, or if delay settings are not indicated in the setup file at block 1718, it is determined if automated generation of gain settings are indicated in the setup file at block 1728. If yes, a simulation is obtained from the memory at block 1730. The simulation may be indicated in the simulation schedule in the setup file. In one example, the simulation obtained may be the delay simulation. The gain engine may be executed to use the simulation and generate gain settings at block 1732.

Gain settings may be generated based on the simulation and the weighting matrix for each of the amplified output channels. If one listening position in the listening space is prioritized in the weighting matrix, and no additional amplified output channel gain is specified, the gain settings may be generated so that the magnitude of sound perceived at the prioritized listening position is substantially uniform. At block 1734, the gain settings may be provided to the settings application simulator, and a simulation with the gain settings applied may be generated. The gain simulation may be the delay simulation with the gain settings applied thereto.

After the gain simulation is generated at block 1734, or if gain settings are not indicated in the setup file at block 1728, it is determined if automated generation of crossover settings is indicated in the setup file at block 1736. If yes, at block 1738, a simulation is obtained from memory. The simulation may not be spatially averaged since the phase of the response data may be included in the simulation. At block 1740, it is determined, based on information in the setup file, which of the amplified output channels are eligible for crossover settings.

The crossover settings are selectively generated for each of the eligible amplified output channels at block 1742. Similar to the amplified channel equalization, in-situ or lab data may be used, and parametric or non-parametric filter design parameters may be generated. In addition, the weighting matrix from the setup file may used during generation. At block 1746, optimized crossover settings may be determined by either a direct optimization engine operable with only the non-parametric engine, or an iterative optimization engine, which may be operable with either the parametric or the non-parametric engine.

Figure 19:
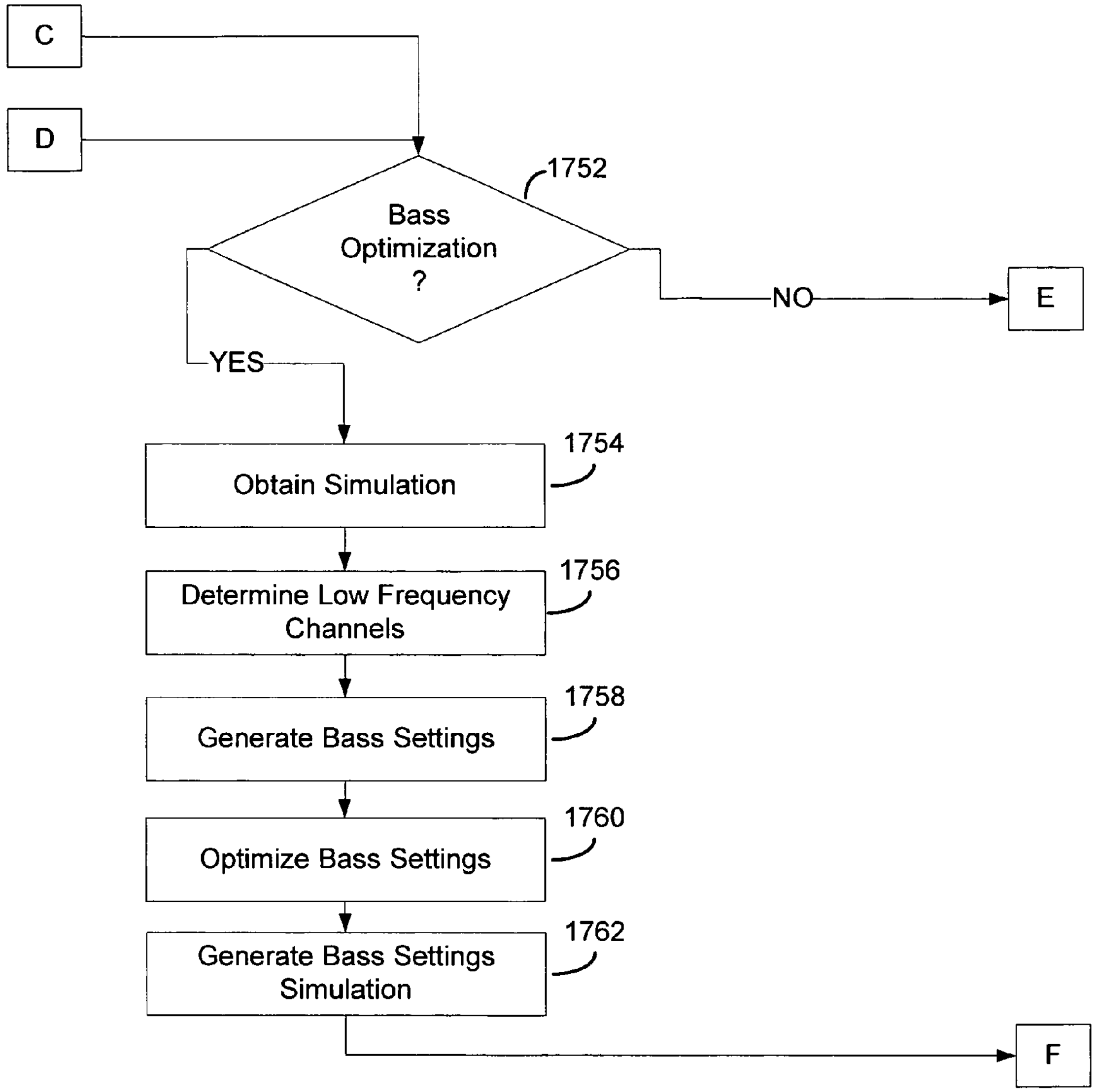
FIG. 19 is a third part of the process flow diagram of FIG. 17.

After the crossover simulation is generated at block 1748, or if crossover settings are not indicated in the setup file at block 1736, it is determined if automated generation of bass optimization settings is indicated in the setup file at block 1752 in FIG. 19. If yes, at block 1754, a simulation is obtained from memory. The simulation may not be spatially averaged similar to the crossover engine since the phase of the response data may be included in the simulation. At block 1756, it is determined based on information in the setup file which of the amplified output channels are driving loudspeakers operable in the lower frequencies.

The bass optimization settings may be selectively generated for each of the identified amplified output channels at block 1758. The bass optimization settings may be generated to correct phase in a weighted sense according to the weighting matrix such that all bass producing speakers sum optimally. Only in-situ data may be used, and parametric and/or non-parametric filter design parameters may be generated. In addition, the weighting matrix from the setup file may used during generation. At block 1760, optimized bass settings may be determined by either a direct optimization engine operable with only the non-parametric engine, or an iterative optimization engine, which may be operable with either the parametric or the non-parametric engine.

Figure 20:
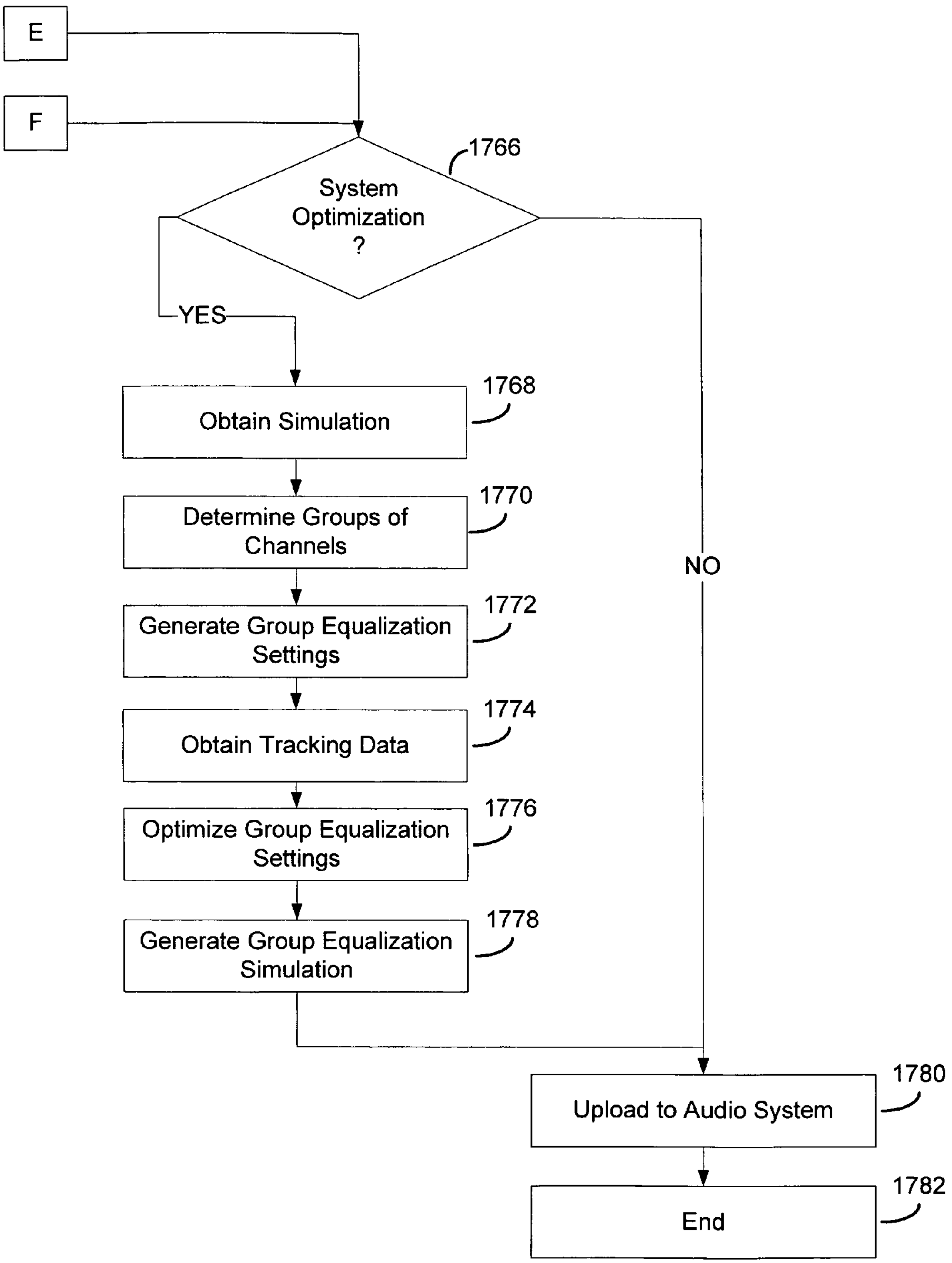
FIG. 20 is a fourth part of the process flow diagram of FIG. 17.

Following generation of bass optimization at block 1762, or if bass optimization settings are not indicated in the setup file at block 1752, it is determined if automated system optimization is indicated in the setup file at block 1766 in FIG. 20. If yes, at block 1768, a simulation is obtained from memory. The simulation may be spatially averaged. At block 1770, it is determined, based on information in the setup file, which groups of amplified output channels may need further equalization.

Group equalization settings may be selectively generated for groups of determined amplified output channels at block 1772. System optimization may include establishing a system gain and limiter, and/or reducing the number of filters. Group equalization settings also may correct response anomalies due to crossover summation and bass optimization on groups of channels as desired.

After completion of the above-described operations, each channel and/or group of channels in the audio system that have been optimized may include the optimal response characteristics according to the weighting matrix. A maximal tuning frequency may be specified such that in-situ equalization is preformed only below a specified frequency. This frequency may be chosen as the transition frequency, and may be the frequency where the measured in-situ response is substantially the same as the predicated in-situ response. Above this frequency, the response may be corrected using only predicted in-situ response correction.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

APPENDIX A

Example Setup File Configuration Information

System Setup File Parameters
- Measurement Sample Rate: Defines the sample rate of the data in the measurement matrix
- DSP Sample Rate: Defines the sample rate at which the DSP operates.
- Input Channel Count (J): Defines the number of input channels to the system. (e.g. for stereo, J=2).
- Spatially Processed Channel Count (K): Defines the number of outputs from the spatial processor, K. (e.g. for Logic7, K=7)
- Spatially Processed Channel Labels: Defines a label for each spatially processed output. (e.g. left front, center, right front . . . )
- Bass Managed Channel Count (M): Defines the number of outputs from the bass manager
- Bass Manager Channel Labels: Defines a label for each bass managed output channel. (e.g. left front, center, right front, subwoofer 1, subwoofer2, . . . )
- Amplified Channel Count (N): Defines the number of amplified channels in the system
- Amplified Channel Labels: Defines a label for each of the amplified channels. (e.g. left front high, left front mid, left front low, center high, center mid, . . . )
- System Channel Mapping Matrix: Defines the amplified channels that correspond to physical spatial processor output channels. (e.g. center=[3,4] for a physical center channel that has 2 amplified channels, 3 and 4, associated with it.)
- Microphone Weighting Matrix: Defines the weighting priority of each individual microphone or group of microphones.
- Amplified Channel Grouping Matrix: Defines the amplified channels that receive the same filters and filter parameters. (e.g. left front and right front)
- Measurement Matrix Mapping: Defines the channels that are associated with the response matrix.

Amplified Channel EQ Setup Parameters
- Parametric EQ Count: Defines the maximum number of parametric EQ's applied to each amplified channel. Value is zero if parametric EQ is not to be applied to a particular channel.
- Parametric EQ Thresholds: Define the allowable parameter range for parametric EQ based on filter Q and/or filter gain.
- Parametric EQ Frequency Resolution: Defines the frequency resolution (in points per octave) that the amplified channel EQ engine uses for parametric EQ computations.
- Parametric EQ Frequency Smoothing: Defines the smoothing window (in points) that the amplified channel EQ engine uses for parametric EQ computations.
- Non-Parametric EQ Frequency Resolution: Defines the frequency resolution (in points per octave) that the amplified channel EQ engine uses for non-parametric EQ computations.
- Non-Parametric EQ Frequency Smoothing: Defines the smoothing window (in points) that the amplified channel EQ engine uses for non-parametric EQ computations.
- Non-Parametric EQ Count: Defines the number of non-parametric biquads that the amplified channel EQ engine can use. Value is zero if non-parametric EQ is not to be applied to a particular channel.
- Amplified Channel EQ Bandwidth: Defines the bandwidth to be filtered for each amplified channel by specifying a low and a high frequency cutoff.
- Parametric EQ Constraints: Defines maximum and minimum allowable settings for parametric EQ filters. (e.g. maximum & minimum Q, frequency and magnitude)
- Non-Parametric EQ constraints: Defines maximum and minimum allowable gain for the total non-parametric EQ chain at a specific frequency. (If constraints are violated in computation, filters are re-calculated to conform to constraints)

Crossover Optimization Parameters
- Crossover Matrix: Defines which channels will have high pass and/or low pass filters applied to them and the channel that will have the complimentary acoustic response. (e.g. left front high and left front low)
- Parametric Crossover Logic Matrix: Defines if parametric crossover filters are used on a particular channel.

Non-Parametric crossover Logic Matrix: Defines if non-parametric crossover filters are used on a particular channel.

Non-Parametric crossover maximum biquad count: Defines the maximum number of biquads that the system can use to compute optimal crossover filters for a given channel.

Initial Crossover Parameter Matrix: Defines the initial parameters for frequency and slope of the high pass and low pass filters that will be used as crossovers Crossover Optimization Frequency Resolution: Defines the frequency resolution (in points per octave) that the amplified channel equalization engine uses for crossover optimization computations.

Crossover Optimization Frequency Smoothing: Defines the smoothing window (in points) that the amplified channel equalization engine uses for crossover optimization computations.

Crossover Optimization Microphone Matrix: Defines which microphones are to be used for crossover optimization computations for each group of channels with crossovers applied.

Parametric Crossover Optimization Constraints: Defines the minimum and maximum values for filter frequency, Q and slope.

Polarity Logic Vector: Defines whether the crossover optimizer has permission to alter the polarity of a given channel. (e.g. 0 for not allowed, 1 for allowed)

Delay Logic Vector: Defines whether the crossover optimizer has permission to alter the delay of a given channel in computing the optimal crossover parameters.

Delay Constraint Matrix: Defines the change in delay that the crossover optimizer can use to compute an optimal set of crossover parameters. Active only if the delay logic vector allows.

Delay Optimization Parameters

Amplified Channel Excess Delay: Defines any additional (non coherent) delay to add to specific amplified channels (in seconds).

Weighting Matrix.

Gain Optimization Parameters

Amplified Channel Excess Gain: Defines and additional gain to add to specific amplified channels.

Weighting Matrix.

Bass Optimization Parameters

Bass Producing Channel Matrix: Defines which channels are defined as bass producing and should thus have bass optimization applied.

Phase Filter Logic Vector: Binary variables for each channel out of the bass manager defining whether phase compensation can be applied to that channel.

Phase Filter Biquad Count: Defines the maximum number of phase filters to be applied to each channel if allowed by Phase Filter Logic Vector.

Bass Optimization Microphone Matrix: Defines which microphones are to be used for bass optimization computations for each group of bass producing channels.

Weighting Matrix.

Target Function Parameters

Target Function: Defines parameters or data points of the target function as applied to each channel out of the spatial processor. (e.g. left front, center, right front, left rear, right rear).

Settings Application Simulator

Simulation Schedule(s): provides selectable information to include in each simulation Order Table: designates an order, or sequence in which settings are generated.

We claim:

1. An automated audio tuning system executable on a computer, comprising:

a setup file configured to store audio system specific configuration settings for an audio system, where the audio system includes a plurality of amplified channels and a plurality of phase modifying filters to be tuned, and where information included in the setup file describes the audio system being tuned;

a measurement interface configured to receive and process an audio response from a plurality of loudspeakers collectively driven by the plurality of amplified audio channels in a listening space, the loudspeakers operable together in the audio system in the listening space to generate the audio response measured by the measurement interface;

a response matrix configured to store the measured audio response received from the plurality of collectively driven loudspeakers; and a bass optimization engine executable with the computer to generate filter design parameters for each of the phase modifying filters, where the phase modifying filters are associated with a selected group of amplified channels included in the plurality of amplified channels, the selected group of amplified channels identified in the setup file as driving a respective subset of the plurality of loudspeakers, the phase modifying filters configured to provide a phase adjustment for each of the amplified channels included in the selected group of amplified channels based on the measured audio response and the audio system specific configuration settings to optimize summation of audible audio responses of the selected group of amplified channels at a listening position within the listening space.

2. The automated audio tuning system of claim 1, where the audio response is an in-situ measured audio response.

3. The automated audio tuning system of claim 1, where the selected group of amplified channels is selected based on an indication in the setup file that each of the amplified channels in the selected group of amplified channels is configured to drive the respective subset of the loudspeakers in a determined frequency range.

4. The automated audio tuning system of claim 3, where the determined frequency range is between about 0 Hz and about 150 Hz.

5. The automated audio tuning system of claim 1, where the phase adjustment of at least two of the selected group of amplified channels is different.

6. The automated audio tuning system of claim 1, where the bass optimization engine is executable to generate the phase adjustment with at least one of a parametric engine or a non-parametric engine, or a combination thereof.

7. The automated audio tuning system of claim 1, where the bass optimization engine includes a direct optimization engine executable to directly determine an optimized phase adjustment for each of the amplified channels in the selected group of amplified channels, and an iterative optimization engine executable to iteratively determine the optimized phase adjustment for each of the amplified channels in the selected group of amplified channels.

8. The automated audio tuning system of claim 7, where determination of the optimized phase adjustments with one of the direct optimization engine and the iterative optimization engine, or a combination thereof, is based on an optimization engine designation that is settable in the setup file.

9. The automated audio tuning system of claim 1, where each of the phase modifying filters is configured to include an IIR filter.

10. The automated audio tuning system of claim 1, where the bass optimization engine is further executable with the computer to iteratively optimize the phase adjustment of each of the phase modifying filters, and in response to determination of an optimized phase adjustment for each of the phase modifying filters, the bass optimization engine is further executable with the computer to reduce an order of at least one of the phase modifying filters.

11. The automated audio tuning system of claim 1, where the bass optimization engine is further executable with the computer to directly determine an optimized phase adjustment for each of the amplified channels in the selected group of amplified channels.

12. The automated audio tuning system of claim 11, where each of the phase modifying filters is configured to include an FIR filter.

13. The automated audio tuning system of claim 11, where the bass optimization engine is further executable with the computer to reduce an order of at least one of the phase modifying filters.

14. A computer readable storage medium comprising an automated audio tuning system executable on a computer, the computer readable storage medium comprising:

computer executable instructions to access a setup file configured to store audio system specific configuration settings for an audio system being tuned, where the audio system includes a plurality of amplified channels in communication with a plurality of loudspeakers;

computer executable instructions to receive and process an audio response from the plurality of loudspeakers being collectively driven by the plurality of amplified audio channels in a listening space, the loudspeakers operable together in the audio system in the listening space to generate the audio response;

computer executable instructions to access a response matrix configured to store the measured audio response received from the loudspeakers being collectively driven by the plurality of amplified audio channels in the listening space;

computer executable instructions to determine which of the amplified channels are in communication with respective loudspeakers configured to produce audible low frequency sound waves in the listening space, the respective loudspeakers configured to produce audible low frequency sound waves in the listening space being a portion of the plurality of loudspeakers;

computer executable instructions to select two or more of the amplified channels based upon the determination that each of the selected amplified channels are in communication with respective loudspeakers configured to produce audible low frequency sound waves;

computer executable instructions to generate, for each of the selected amplified channels, filter design parameters for a respective phase modifying filter based on the measured audio response and the audio system specific configuration settings, the filter design parameters generated to optimize a relative phase relationship between each of the selected amplified channels in the listening space; and the filter design parameters for each respective phase modifying filter generated uniquely for each of the selected amplified channels to optimize summation of the audible low frequency sound waves at the listening position in the listening space.

15. The computer readable storage medium of claim 14, where the measured audio response is an in-situ measured audio response of the loudspeakers when installed in a vehicle.

16. The computer readable storage medium of claim 14, where the audible low frequency sound waves are in a range less than or equal to 150 Hz.

17. The computer readable storage medium of claim 14, where the selected amplified channels include a first selected amplified channel and a second selected amplified channel, the first selected amplified channel in communication with a first phase modifying filter having a first set of filter design parameters, the second selected amplified channel in communication with a second phase modifying filter having a second set of filter design parameters, and where the first set of filter design parameters are different from the second set of filter design parameters.

18. The computer readable storage medium of claim 14, further comprising:

computer executable instructions to generate the filter design parameters for each of the selected amplified channels based upon outputs of a parametric engine or a non-parametric engine, or a combination thereof.

19. The computer readable storage medium of claim 14, further comprising:

computer executable instructions to directly generate the filter design parameters of at least one phase modifying filter to optimize the relative phase relationship between each of the selected amplified channels.

20. The computer readable storage medium of claim 19, where the phase modifying filter for at least one of the selected amplifier channels includes an FIR filter.

21. The computer readable storage medium of claim 14, where the phase modifying filter for each of the selected amplified channels includes a filter order, the computer readable storage medium further comprising:

computer executable instructions to reduce the filter order of at least one phase modifying filter of the selected amplified channels.

22. The computer readable storage medium of claim 21, where the computer executable instructions to reduce the filter order of at least one phase modifying filter comprises:

computer executable instructions to generate filter design parameters for a lower order phase modifying filter that fits the at least one phase modifying filter, where the lower order phase modifying filter has a filter order that is less than the filter order of the at least one phase modifying filter;

computer executable instructions to determine a response difference between the lower order phase modifying filter and the at least one phase modifying filter;

computer executable instructions to determine whether the response difference is less than a determined amount;

computer executable instructions responsive to determination that the response difference is less than a determined amount to generate an indication of an acceptable fit; and computer executable instructions responsive to generation of the indication of the acceptable fit to replace the filter design parameters of the at least one phase modifying filter with filter design parameters of the lower order phase modifying filter.

23. The computer readable storage medium of claim 14, where at least one of the respective phase modifying filters includes an FIR filter having FIR filter parameters, and the computer readable storage media further comprises:

computer executable instructions to convert the FIR filter parameters of the at least one of the respective phase modifying filters to parameters for an IIR filter.

24. The computer readable storage medium of claim 14, further comprising:

computer executable instructions to determine the filter design parameters for each respective phase modifying filter for each of the selected amplified channels by direct generation of a transfer function for each of the phase modifying filters of each of the selected amplified channels, iterative generation of the transfer function for each of the phase modifying filters, or a combination thereof, based upon a designation selected in the setup file.

25. A method for an automated audio tuning system comprising:

accessing a setup file configured to store audio system specific configuration settings for an audio system being tuned, where the audio system includes a plurality of amplified channels in communication with a plurality of loudspeakers;

receiving and processing an audio response from the loudspeakers being collectively driven by the amplified channels in a listening space, the loudspeakers operable together in the audio system in the listening space to generate the audio response;

accessing a response matrix configured to store the measured audio response received from the loudspeakers being collectively driven by the amplified channels in the listening space;

determining which of the amplified channels are in communication with respective loudspeakers configured to produce audible low frequency sound waves in the listening space, the respective loudspeakers configured to produce audible low frequency sound waves in the listening space being included as a portion of the plurality of loudspeakers;

selecting two or more of the amplified channels based upon determination that each of the selected amplified channels are in communication with respective loudspeakers configured to produce audible low frequency sound waves;

generating, for each of the selected amplified channels, filter design parameters for a respective phase modifying filter based on the measured audio response and the audio system specific configuration settings to optimize a relative phase relationship between each of the selected amplified channels in the listening space; and uniquely generating the filter design parameters for each respective modifying filter for each of the selected amplified channels to optimize summation of the audible low frequency sound waves at a listening location in the listening space.

26. The method of claim 25, where the measured audio response is an in-situ measured audio response of the loudspeakers when installed in a vehicle.

27. The method of claim 25, where the audible low frequency sound waves are in a range less than or equal to 150 Hz.

28. The method of claim 25, where the selected amplified channels include a first selected amplified channel and a second selected amplified channel, the first selected amplified channel in communication with a first phase modifying filter having a first set of filter design parameters, the second selected amplified channel in communication with a second phase modifying filter having a second set of filter design parameters, and where the first set of filter design parameters are different from the second set of filter design parameters.

29. The method of claim 25, further comprising:

generating the filter design parameters of each respective phase modifying filter for each of the selected amplified channels based upon outputs of a parametric engine or a non-parametric engine, or a combination thereof.

30. The method of claim 25, further comprising:

directly generating the filter design parameters of at least one phase modifying filter to optimize the relative phase relationship between each of the selected amplified channels.

31. The method of claim 30, where the phase modifying filter for at least one of the selected amplifier channels includes an FIR filter.

32. The method of claim 25, where the phase modifying filter for each of the selected amplified channels includes a filter order, the method further comprising:

reducing the filter order of at least one phase modifying filter of the selected amplified channels.

33. The method of claim 32, further comprising:

generating filter design parameters for a lower order phase modifying filter that fits the at least one phase modifying filter, where the lower order phase modifying filter has a filter order that is less than the filter order of the at least one phase modifying filter;

determining a response difference between the lower order phase modifying filter and the at least one phase modifying filter;

determining whether the response difference is less than a determined amount;

generating an indication of an acceptable fit when the response difference is less than a determined amount; and replacing the filter design parameters of the at least one phase modifying filter with the filter design parameters of the lower order phase modifying filter in response to generation of the indication of the acceptable fit.

34. The method of claim 25, where at least one of the respective phase modifying filters includes an FIR filter having FIR filter parameters, and the method further comprises:

converting the FIR filter parameters of the at least one of the respective phase modifying filters to parameters for an IIR filter.

35. The method of claim 25, further comprising:

determining filter design parameters for each respective phase modifying filter for each of the selected amplified channels by direct generation of a transfer function for the phase modifying filter of each of the selected amplified channels, iterative generation of a transfer function for the phase modifying filter, or a combination thereof, based upon a designation selected in the setup file.

* * * * *